US009024166B2

(12) United States Patent
Ramos

(10) Patent No.: US 9,024,166 B2
(45) Date of Patent: May 5, 2015

(54) PREVENTING SUBTRACTIVE TRACK SEPARATION

(75) Inventor: Aurelio R. Ramos, Jamaica Plain, MA (US)

(73) Assignee: Harmonix Music Systems, Inc., Cambridge, MA (US)

( * ) Notice: Subject to any disclaimer, the term of this patent is extended or adjusted under 35 U.S.C. 154(b) by 1115 days.

(21) Appl. No.: 12/878,863

(22) Filed: Sep. 9, 2010

(65) Prior Publication Data
US 2012/0063617 A1 Mar. 15, 2012

(51) Int. Cl.
*G10H 1/36* (2006.01)
*G10H 7/00* (2006.01)
*G11B 20/10* (2006.01)
*G11B 20/00* (2006.01)

(52) U.S. Cl.
CPC .... *G11B 20/10527* (2013.01); *G11B 20/00826* (2013.01); *G11B 2020/10555* (2013.01)

(58) Field of Classification Search
USPC ............................................. 84/610; 726/26
See application file for complete search history.

(56) References Cited

U.S. PATENT DOCUMENTS

| D211,666 S | 7/1968 | MacGillavry |
| 3,430,530 A | 3/1969 | Fletcher et al. |
| 3,897,711 A | 8/1975 | Elledge |
| D245,038 S | 7/1977 | Ebata et al. |
| D247,795 S | 4/1978 | Darrell |
| 4,128,037 A | 12/1978 | Montemurro |
| D259,785 S | 7/1981 | Kushida et al. |
| 4,295,406 A | 10/1981 | Smith |
| D262,017 S | 11/1981 | Frakes, Jr. |
| D265,821 S | 8/1982 | Okada et al. |
| D266,664 S | 10/1982 | Hoshino et al. |
| D287,521 S | 12/1986 | Obara |
| 4,644,495 A | 2/1987 | Crane |
| 4,766,541 A | 8/1988 | Bleich et al. |

(Continued)

FOREIGN PATENT DOCUMENTS

| AT | 468071 T | 6/2010 |
| AU | 741239 B2 | 4/1999 |

(Continued)

OTHER PUBLICATIONS

"BVH File Specification", Character Studio, http://web.archive.org/web/20060321075406/http://character-studio.net/bvh_file_specification.htm, Mar. 21, 2006 (16 pages).

(Continued)

*Primary Examiner* — Jeffrey Donels
(74) *Attorney, Agent, or Firm* — Wilmer Cutler Pickering Hale and Dorr LLP

(57) ABSTRACT

Disclosed are techniques for preventing extraction of original audio tracks from a song. The techniques are executed on a game platform and involve providing a first and second audio track representing parts of a musical composition, mixing the first audio track and the second audio track to provide a mixed audio track, generating an audio modification data comprising a series of substantially random audio modifiers, and then modifying, before playback, the mixed audio track based on the audio modification data to provide a modified mixed audio track, such that subtracting the second audio track from the modified mixed audio track produces a third audio track with an audibly detectable deviation from the first audio track.

17 Claims, 13 Drawing Sheets

(56) References Cited

U.S. PATENT DOCUMENTS

| | | |
|---|---|---|
| 4,783,812 A | 11/1988 | Kaneoka |
| 4,794,838 A | 1/1989 | Corrigau, III |
| 4,843,568 A | 6/1989 | Krueger et al. |
| 4,890,833 A | 1/1990 | Lantz et al. |
| D310,668 S | 9/1990 | Takada |
| 5,074,182 A | 12/1991 | Capps et al. |
| 5,107,743 A | 4/1992 | Decker |
| 5,109,482 A | 4/1992 | Bohrman |
| 5,140,889 A | 8/1992 | Segan et al. |
| 5,194,683 A | 3/1993 | Tsumura et al. |
| 5,208,413 A | 5/1993 | Tsumura et al. |
| 5,250,745 A | 10/1993 | Tsumura |
| 5,262,765 A | 11/1993 | Tsumura et al. |
| 5,287,789 A | 2/1994 | Zimmerman |
| D345,554 S | 3/1994 | Dones |
| 5,362,049 A | 11/1994 | Hofer |
| 5,368,309 A | 11/1994 | Monroe et al. |
| 5,393,926 A | 2/1995 | Johnson |
| 5,395,123 A | 3/1995 | Kondo |
| 5,398,585 A | 3/1995 | Starr |
| 5,399,799 A | 3/1995 | Gabriel |
| 5,434,949 A | 7/1995 | Jeong |
| 5,453,570 A | 9/1995 | Umeda et al. |
| 5,464,946 A | 11/1995 | Lewis |
| 5,469,370 A * | 11/1995 | Ostrover et al. ............... 711/111 |
| 5,482,087 A | 1/1996 | Overbergh et al. |
| 5,488,196 A | 1/1996 | Zimmerman et al. |
| 5,491,297 A | 2/1996 | Johnson et al. |
| 5,510,573 A | 4/1996 | Cho et al. |
| 5,513,129 A | 4/1996 | Fakespace |
| 5,524,637 A | 6/1996 | Erickson |
| 5,534,917 A | 7/1996 | MacDougall |
| 5,537,528 A | 7/1996 | Takahashi et al. |
| 5,553,864 A | 9/1996 | Sitrick |
| 5,557,056 A | 9/1996 | Hong et al. |
| 5,557,057 A | 9/1996 | Starr |
| 5,563,358 A | 10/1996 | Zimmerman |
| 5,565,639 A | 10/1996 | Bae |
| 5,567,162 A | 10/1996 | Park |
| 5,568,275 A | 10/1996 | Norton et al. |
| 5,574,238 A | 11/1996 | Mencher |
| 5,613,909 A | 3/1997 | Stelovsky |
| 5,616,078 A | 4/1997 | Oh |
| 5,627,335 A | 5/1997 | Rigopulos et al. |
| 5,631,433 A | 5/1997 | Iida et al. |
| 5,634,849 A | 6/1997 | Abecassis |
| 5,663,517 A | 9/1997 | Oppenheim |
| 5,670,729 A | 9/1997 | Miller et al. |
| 5,681,223 A | 10/1997 | Weinreich |
| 5,693,903 A | 12/1997 | Heidorn et al. |
| D389,216 S | 1/1998 | Isetani et al. |
| 5,704,836 A | 1/1998 | Norton et al. |
| 5,715,179 A | 2/1998 | Park |
| 5,719,344 A | 2/1998 | Pawate |
| 5,723,802 A | 3/1998 | Johnson et al. |
| 5,734,961 A | 3/1998 | Castille |
| 5,739,457 A | 4/1998 | Devecka |
| 5,763,804 A | 6/1998 | Rigopulos et al. |
| 5,768,396 A | 6/1998 | Sone |
| 5,777,251 A | 7/1998 | Hotta et al. |
| 5,782,692 A | 7/1998 | Stelovsky |
| D398,916 S | 9/1998 | Bernardi |
| 5,804,752 A | 9/1998 | Sone et al. |
| D399,887 S | 10/1998 | Schultz et al. |
| D400,196 S | 10/1998 | Cameron et al. |
| 5,824,933 A | 10/1998 | Gabriel |
| 5,825,427 A | 10/1998 | MacLeod |
| 5,830,065 A | 11/1998 | Sitrick |
| 5,833,469 A | 11/1998 | Ito et al. |
| D403,024 S | 12/1998 | Muraki et al. |
| 5,861,881 A | 1/1999 | Freeman et al. |
| 5,874,686 A | 2/1999 | Ghias et al. |
| 5,880,788 A | 3/1999 | Bregler |
| 5,886,275 A | 3/1999 | Kato et al. |
| 5,889,224 A | 3/1999 | Tanaka |
| 5,906,494 A | 5/1999 | Ogawa et al. |
| D411,258 S | 6/1999 | Isetani et al. |
| 5,913,727 A | 6/1999 | Ahdoot |
| 5,915,288 A | 6/1999 | Gabriel |
| 5,915,972 A | 6/1999 | Tada |
| 5,915,975 A | 6/1999 | McGrath |
| 5,925,843 A | 7/1999 | Miller et al. |
| 5,953,005 A | 9/1999 | Liu |
| 5,953,485 A | 9/1999 | Abecassis |
| 5,969,716 A | 10/1999 | Davis et al. |
| 5,983,280 A | 11/1999 | Hunt |
| 5,990,405 A | 11/1999 | Auten et al. |
| 5,999,173 A | 12/1999 | Ubillos |
| 6,001,013 A | 12/1999 | Ota |
| 6,009,457 A | 12/1999 | Moller |
| 6,011,212 A | 1/2000 | Rigopulos et al. |
| 6,016,380 A | 1/2000 | Norton |
| 6,018,121 A | 1/2000 | Devecka |
| 6,032,156 A | 2/2000 | Marcus |
| 6,065,042 A | 5/2000 | Reimer et al. |
| 6,066,792 A | 5/2000 | Sone |
| 6,067,126 A | 5/2000 | Alexander |
| 6,067,566 A | 5/2000 | Moline |
| 6,072,113 A | 6/2000 | Tohgi et al. |
| 6,072,480 A | 6/2000 | Gorbet et al. |
| 6,073,489 A | 6/2000 | French et al. |
| 6,074,215 A | 6/2000 | Tsurumi |
| 6,075,197 A | 6/2000 | Chan |
| 6,083,009 A | 7/2000 | Kim et al. |
| 6,091,408 A | 7/2000 | Treibitz et al. |
| 6,098,458 A | 8/2000 | French et al. |
| 6,118,444 A | 9/2000 | Garmon et al. |
| 6,121,531 A | 9/2000 | Kato |
| 6,142,870 A | 11/2000 | Wada et al. |
| 6,150,947 A | 11/2000 | Shima |
| 6,162,981 A | 12/2000 | Newcomer et al. |
| 6,166,314 A | 12/2000 | Weinstock et al. |
| 6,177,623 B1 | 1/2001 | Ooseki |
| 6,182,044 B1 | 1/2001 | Fong et al. |
| 6,184,899 B1 | 2/2001 | Akemann |
| 6,191,350 B1 | 2/2001 | Okulov et al. |
| 6,215,411 B1 | 4/2001 | Gothard |
| 6,224,486 B1 | 5/2001 | Walker et al. |
| 6,225,547 B1 | 5/2001 | Toyama et al. |
| 6,227,968 B1 | 5/2001 | Suzuki et al. |
| 6,227,974 B1 | 5/2001 | Eilat et al. |
| 6,243,087 B1 | 6/2001 | Davis et al. |
| 6,243,092 B1 | 6/2001 | Okita et al. |
| 6,252,153 B1 | 6/2001 | Toyama |
| 6,262,724 B1 | 7/2001 | Crow et al. |
| 6,263,392 B1 | 7/2001 | McCauley |
| 6,268,557 B1 | 7/2001 | Devecka |
| 6,283,860 B1 | 9/2001 | Lyons et al. |
| 6,287,198 B1 | 9/2001 | McCauley |
| 6,288,727 B1 | 9/2001 | Akemann |
| 6,292,620 B1 | 9/2001 | Ohmori et al. |
| 6,307,576 B1 | 10/2001 | Rosenfeld |
| 6,308,565 B1 | 10/2001 | French et al. |
| 6,309,301 B1 | 10/2001 | Sano |
| 6,319,129 B1 | 11/2001 | Igarashi et al. |
| 6,319,130 B1 | 11/2001 | Ooseki et al. |
| 6,320,110 B1 | 11/2001 | Ishikawa et al. |
| 6,326,536 B1 | 12/2001 | Wang |
| 6,329,620 B1 | 12/2001 | Oishi et al. |
| 6,337,433 B1 | 1/2002 | Nishimoto |
| 6,342,665 B1 | 1/2002 | Okita et al. |
| 6,347,998 B1 | 2/2002 | Yoshitomi et al. |
| 6,350,942 B1 | 2/2002 | Thomson |
| 6,352,432 B1 | 3/2002 | Tsai et al. |
| 6,353,174 B1 | 3/2002 | Schmidt et al. |
| D455,792 S | 4/2002 | Isetani et al. |
| 6,369,313 B2 | 4/2002 | Devecka |
| 6,379,244 B1 | 4/2002 | Sagawa et al. |
| 6,380,474 B2 | 4/2002 | Taruguchi et al. |
| 6,380,950 B1 | 4/2002 | Montgomery et al. |
| 6,384,736 B1 | 5/2002 | Gothard |
| 6,390,923 B1 | 5/2002 | Yoshitomi et al. |
| 6,392,133 B1 | 5/2002 | Georges |
| 6,407,324 B1 | 6/2002 | Hulcher |

(56) References Cited

U.S. PATENT DOCUMENTS

| | | | |
|---|---|---|---|
| 6,410,835 B2 | 6/2002 | Suzuki et al. |
| 6,417,432 B1 | 7/2002 | Downing |
| 6,425,822 B1 | 7/2002 | Hayashida et al. |
| 6,425,825 B1 | 7/2002 | Sitrick |
| 6,425,827 B1 | 7/2002 | Nimura |
| 6,425,828 B2 | 7/2002 | Walker et al. |
| 6,429,863 B1 | 8/2002 | LoPiccolo et al. |
| 6,430,997 B1 | 8/2002 | French et al. |
| 6,437,227 B1 | 8/2002 | Theimer |
| 6,438,611 B1 | 8/2002 | Hara et al. |
| D462,698 S | 9/2002 | Sturm |
| 6,444,887 B1 | 9/2002 | Hiraoka et al. |
| 6,450,886 B1 | 9/2002 | Oishi et al. |
| 6,450,888 B1 | 9/2002 | Takase et al. |
| 6,461,239 B1 | 10/2002 | Sagawa et al. |
| 6,463,205 B1 | 10/2002 | Aschbrenner et al. |
| 6,464,585 B1 | 10/2002 | Miyamoto et al. |
| 6,468,161 B1 | 10/2002 | Shimomura |
| 6,471,584 B1 | 10/2002 | Wada et al. |
| 6,482,087 B1 | 11/2002 | Egozy et al. |
| 6,483,018 B2 | 11/2002 | Mead |
| 6,504,089 B1 | 1/2003 | Negishi et al. |
| 6,504,990 B1 | 1/2003 | Abecassis |
| 6,506,969 B1 | 1/2003 | Baron |
| 6,514,083 B1 | 2/2003 | Kumar et al. |
| 6,527,639 B2 | 3/2003 | Suzuki |
| 6,530,834 B2 | 3/2003 | Kondo |
| 6,530,839 B2 | 3/2003 | Horio |
| 6,535,269 B2 | 3/2003 | Sherman et al. |
| 6,540,613 B2 | 4/2003 | Okubo et al. |
| 6,541,692 B2 | 4/2003 | Miller |
| 6,542,155 B1 | 4/2003 | Mifune et al. |
| 6,542,168 B2 | 4/2003 | Negishi et al. |
| 6,544,119 B2 | 4/2003 | Kubo et al. |
| 6,544,122 B2 | 4/2003 | Araki et al. |
| 6,544,125 B2 | 4/2003 | Horigami et al. |
| 6,554,706 B2 | 4/2003 | Kim et al. |
| 6,554,711 B1 | 4/2003 | Kawasaki et al. |
| 6,555,737 B2 | 4/2003 | Miyaki et al. |
| 6,570,078 B2 | 5/2003 | Ludwig |
| 6,577,330 B1 | 6/2003 | Tsuda et al. |
| 6,582,235 B1 | 6/2003 | Tsai et al. |
| 6,582,309 B2 | 6/2003 | Higurashi et al. |
| 6,589,120 B1 | 7/2003 | Takahashi |
| 6,598,074 B1 | 7/2003 | Moller et al. |
| 6,599,195 B1 | 7/2003 | Araki et al. |
| 6,607,446 B1 | 8/2003 | Shimomura et al. |
| 6,608,249 B2 | 8/2003 | Georges |
| 6,609,979 B1 | 8/2003 | Wada |
| 6,611,278 B2 | 8/2003 | Rosenfeld |
| 6,612,931 B2 | 9/2003 | Kojima et al. |
| 6,613,100 B2 | 9/2003 | Miller |
| 6,618,053 B1 | 9/2003 | Tanner |
| 6,621,503 B1 | 9/2003 | Ubillos |
| 6,623,358 B2 | 9/2003 | Harima |
| 6,629,892 B2 | 10/2003 | Oe et al. |
| 6,634,886 B2 | 10/2003 | Oyama et al. |
| 6,636,877 B1 | 10/2003 | Doleac et al. |
| 6,638,160 B2 | 10/2003 | Yoshitomi |
| 6,645,067 B1 | 11/2003 | Okita et al. |
| 6,645,076 B1 | 11/2003 | Sugai |
| 6,645,784 B2 | 11/2003 | Tayebati et al. |
| 6,653,545 B2 | 11/2003 | Redmann et al. |
| 6,659,873 B1 | 12/2003 | Kitano et al. |
| 6,661,496 B2 | 12/2003 | Sherman et al. |
| 6,663,491 B2 | 12/2003 | Watabe et al. |
| 6,666,764 B1 | 12/2003 | Kudo |
| 6,669,563 B1 | 12/2003 | Kitami et al. |
| 6,676,523 B1 | 1/2004 | Kasai et al. |
| 6,682,424 B2 | 1/2004 | Yamauchi et al. |
| 6,684,480 B2 | 2/2004 | Conrad |
| 6,685,480 B2 | 2/2004 | Nishimoto et al. |
| 6,695,694 B2 | 2/2004 | Ishikawa et al. |
| 6,712,692 B2 | 3/2004 | Basson et al. |
| 6,725,108 B1 | 4/2004 | Hall |
| 6,727,889 B2 | 4/2004 | Shaw |
| 6,733,382 B2 | 5/2004 | Oe et al. |
| 6,738,052 B1 | 5/2004 | Manke et al. |
| 6,740,802 B1 | 5/2004 | Browne, Jr. |
| 6,740,803 B2 | 5/2004 | Brinkman et al. |
| 6,743,099 B2 | 6/2004 | Yabe et al. |
| 6,749,432 B2 | 6/2004 | French et al. |
| 6,749,508 B2 | 6/2004 | Kohira et al. |
| 6,750,848 B1 | 6/2004 | Pryor |
| 6,758,753 B1 | 7/2004 | Nagata et al. |
| 6,758,756 B1 | 7/2004 | Horigami et al. |
| 6,764,399 B2 | 7/2004 | Nagata et al. |
| 6,765,590 B1 | 7/2004 | Watahiki et al. |
| 6,765,726 B2 | 7/2004 | French et al. |
| 6,767,282 B2 | 7/2004 | Matsuyama et al. |
| 6,769,689 B1 | 8/2004 | Shimomura et al. |
| 6,786,821 B2 | 9/2004 | Nobe et al. |
| 6,801,930 B1 | 10/2004 | Dionne et al. |
| 6,811,491 B1 | 11/2004 | Levenberg et al. |
| 6,821,203 B2 | 11/2004 | Suga et al. |
| 6,831,220 B2 | 12/2004 | Varme |
| 6,831,656 B2 | 12/2004 | Kitao |
| 6,835,136 B2 | 12/2004 | Kitao |
| 6,835,887 B2 | 12/2004 | Devecka |
| 6,838,608 B2 | 1/2005 | Koike |
| 6,843,726 B1 | 1/2005 | Nomi et al. |
| 6,850,252 B1 | 2/2005 | Hoffberg |
| 6,852,034 B2 | 2/2005 | Nagata et al. |
| 6,856,923 B2 | 2/2005 | Jung |
| 6,857,960 B2 | 2/2005 | Okubo et al. |
| D503,407 S | 3/2005 | Kaku |
| 6,876,496 B2 | 4/2005 | French et al. |
| 6,881,148 B2 | 4/2005 | Yotsugi et al. |
| 6,881,887 B2 | 4/2005 | Berens |
| 6,890,262 B2 | 5/2005 | Oishi et al. |
| 6,893,343 B2 | 5/2005 | Suda et al. |
| 6,894,693 B1 | 5/2005 | Nash |
| 6,898,637 B2 | 5/2005 | Curtin |
| 6,905,413 B1 | 6/2005 | Terao et al. |
| 6,915,488 B2 | 7/2005 | Omori et al. |
| 6,921,332 B2 | 7/2005 | Fukunaga et al. |
| 6,924,425 B2 | 8/2005 | Naples et al. |
| 6,930,235 B2 | 8/2005 | Sandborn et al. |
| 6,930,236 B2 | 8/2005 | Jung |
| 6,936,758 B2 | 8/2005 | Itoh |
| 6,949,023 B1 | 9/2005 | Okubo et al. |
| 6,953,887 B2 | 10/2005 | Nagashima et al. |
| 6,964,610 B2 | 11/2005 | Yamauchi et al. |
| 6,967,275 B2 | 11/2005 | Ozick |
| 6,976,918 B2 | 12/2005 | Hosokawa |
| 6,991,542 B2 | 1/2006 | Asami et al. |
| 6,995,765 B2 | 2/2006 | Boudier |
| 6,995,869 B2 | 2/2006 | Onodera |
| 6,998,527 B2 | 2/2006 | Agnihotri |
| 7,000,200 B1 | 2/2006 | Martins |
| 7,001,272 B2 | 2/2006 | Yamashita et al. |
| 7,010,291 B2 | 3/2006 | Iwanaga |
| D519,569 S | 4/2006 | Kiyono et al. |
| 7,022,905 B1 | 4/2006 | Hinman et al. |
| 7,027,046 B2 | 4/2006 | Zhang |
| 7,027,124 B2 | 4/2006 | Foote et al. |
| 7,030,307 B2 | 4/2006 | Wedel |
| 7,030,311 B2 | 4/2006 | Brinkman et al. |
| 7,037,197 B2 | 5/2006 | Watanabe |
| 7,038,855 B2 | 5/2006 | French et al. |
| 7,044,856 B2 | 5/2006 | Suzuki |
| 7,044,857 B1 | 5/2006 | Klitsner et al. |
| 7,064,672 B2 | 6/2006 | Gothard |
| 7,066,818 B2 | 6/2006 | Ikeda |
| 7,069,296 B2 | 6/2006 | Moller et al. |
| 7,070,500 B1 | 7/2006 | Nomi et al. |
| 7,071,914 B1 | 7/2006 | Marks |
| 7,074,999 B2 | 7/2006 | Sitrick et al. |
| 7,076,052 B2 | 7/2006 | Yoshimura |
| 7,078,607 B2 * | 7/2006 | Alferness ........................ 84/609 |
| 7,079,026 B2 | 7/2006 | Smith |
| 7,079,114 B1 | 7/2006 | Smith et al. |
| 7,084,855 B2 | 8/2006 | Kaku et al. |
| 7,084,888 B2 | 8/2006 | Takahama et al. |

(56) References Cited

U.S. PATENT DOCUMENTS

| | | |
|---|---|---|
| 7,098,392 B2 | 8/2006 | Sitrick et al. |
| 7,098,921 B2 | 8/2006 | Nash et al. |
| 7,103,873 B2 | 9/2006 | Tanner et al. |
| 7,119,268 B2 | 10/2006 | Futamase et al. |
| 7,122,751 B1 | 10/2006 | Anderson et al. |
| 7,123,272 B2 | 10/2006 | Moriyama |
| 7,126,607 B2 | 10/2006 | Emerson |
| 7,128,649 B2 | 10/2006 | Nobe et al. |
| 7,129,408 B2 | 10/2006 | Uehara |
| 7,134,876 B2 | 11/2006 | Hou |
| 7,142,807 B2 | 11/2006 | Lee |
| 7,143,353 B2 | 11/2006 | McGee et al. |
| 7,145,070 B2 | 12/2006 | Barry |
| D535,659 S | 1/2007 | Hally et al. |
| 7,164,075 B2 | 1/2007 | Tada |
| 7,164,076 B2 | 1/2007 | McHale et al. |
| 7,169,998 B2 | 1/2007 | Kondo et al. |
| 7,170,510 B2 | 1/2007 | Kawahara et al. |
| 7,174,510 B2 | 2/2007 | Salter |
| 7,189,912 B2 | 3/2007 | Jung |
| 7,192,353 B2 | 3/2007 | Okubo |
| 7,194,676 B2 | 3/2007 | Fayan et al. |
| 7,199,298 B2 | 4/2007 | Funaki |
| 7,199,801 B2 | 4/2007 | Tsunashima et al. |
| 7,201,659 B2 | 4/2007 | Nakayama et al. |
| 7,208,672 B2 * | 4/2007 | Camiel ............... 84/625 |
| 7,221,852 B2 | 5/2007 | Iizuka et al. |
| 7,223,913 B2 | 5/2007 | Knapp et al. |
| 7,227,526 B2 | 6/2007 | Hildreth et al. |
| 7,232,949 B2 * | 6/2007 | Hruska et al. ........... 84/610 |
| 7,259,357 B2 | 8/2007 | Walker |
| 7,259,971 B1 | 8/2007 | Allen et al. |
| 7,263,668 B1 | 8/2007 | Lentz |
| 7,271,329 B2 | 9/2007 | Franzblau |
| 7,272,780 B2 | 9/2007 | Abbott et al. |
| 7,274,803 B1 | 9/2007 | Sharma et al. |
| 7,304,232 B1 | 12/2007 | Nicholes |
| 7,317,812 B1 | 1/2008 | Krahnstoever et al. |
| 7,320,643 B1 | 1/2008 | Brosius et al. |
| 7,323,631 B2 | 1/2008 | Miyaki et al. |
| 7,324,165 B2 | 1/2008 | Shan et al. |
| 7,336,890 B2 | 2/2008 | Lu et al. |
| 7,346,472 B1 | 3/2008 | Moskowitz et al. |
| 7,352,359 B2 | 4/2008 | Zalewski et al. |
| 7,352,952 B2 | 4/2008 | Herberger et al. |
| 7,359,121 B2 | 4/2008 | French et al. |
| 7,359,617 B2 | 4/2008 | Ma |
| D568,659 S | 5/2008 | Ophardt et al. |
| D568,892 S | 5/2008 | Stabb et al. |
| D569,382 S | 5/2008 | Yow et al. |
| 7,367,887 B2 | 5/2008 | Watabe et al. |
| 7,383,508 B2 | 6/2008 | Toyama et al. |
| 7,391,409 B2 | 6/2008 | Zalewski et al. |
| 7,391,874 B1 | 6/2008 | Semmes, Jr. et al. |
| D572,265 S | 7/2008 | Guimaraes et al. |
| 7,398,002 B2 | 7/2008 | Hsiao et al. |
| 7,408,106 B2 | 8/2008 | Weiner et al. |
| 7,423,213 B2 | 9/2008 | Sitrick |
| 7,430,360 B2 | 9/2008 | Abecassis |
| 7,432,810 B2 | 10/2008 | Menache et al. |
| 7,435,178 B1 | 10/2008 | Tam et al. |
| 7,453,035 B1 | 11/2008 | Evans et al. |
| 7,458,025 B2 | 11/2008 | Crow et al. |
| 7,459,324 B1 | 12/2008 | Ptasinski et al. |
| 7,459,624 B2 | 12/2008 | Schmidt et al. |
| 7,462,772 B2 | 12/2008 | Salter |
| 7,480,446 B2 | 1/2009 | Bhadkamkar et al. |
| 7,480,873 B2 | 1/2009 | Kawahara |
| 7,488,886 B2 | 2/2009 | Kemp |
| D590,407 S | 4/2009 | Watanabe et al. |
| 7,521,619 B2 | 4/2009 | Salter |
| 7,525,036 B2 * | 4/2009 | Shotwell et al. ......... 84/611 |
| 7,528,315 B2 | 5/2009 | Goodwin |
| 7,536,654 B2 | 5/2009 | Anthony et al. |
| 7,546,130 B2 | 6/2009 | Vance |
| 7,559,834 B1 | 7/2009 | York |
| 7,559,841 B2 | 7/2009 | Hashimoto |
| 7,579,543 B2 | 8/2009 | Haruyama et al. |
| D599,812 S | 9/2009 | Hirsch |
| D599,819 S | 9/2009 | Lew |
| 7,582,015 B2 | 9/2009 | Onoda et al. |
| 7,589,727 B2 | 9/2009 | Haeker |
| 7,593,618 B2 | 9/2009 | Xu et al. |
| 7,599,554 B2 | 10/2009 | Agnihotri et al. |
| 7,605,322 B2 | 10/2009 | Nakamura |
| 7,612,278 B2 | 11/2009 | Sitrick et al. |
| 7,625,284 B2 | 12/2009 | Kay et al. |
| 7,628,699 B2 | 12/2009 | Onoda et al. |
| 7,640,069 B1 | 12/2009 | Johnston |
| D607,892 S | 1/2010 | Murchie et al. |
| 7,649,134 B2 | 1/2010 | Kashioka |
| D609,715 S | 2/2010 | Chaudhri |
| 7,660,510 B2 | 2/2010 | Kawahara et al. |
| 7,660,700 B2 | 2/2010 | Moskowitz et al. |
| 7,690,017 B2 | 3/2010 | Stecyk et al. |
| 7,692,630 B2 | 4/2010 | Natsume et al. |
| 7,714,849 B2 | 5/2010 | Pryor |
| 7,716,572 B2 | 5/2010 | Beauregard et al. |
| 7,722,450 B2 | 5/2010 | Onoda et al. |
| 7,747,348 B2 | 6/2010 | Shim et al. |
| D619,598 S | 7/2010 | Maitlen et al. |
| D619,609 S | 7/2010 | Meziere |
| 7,754,961 B1 | 7/2010 | Yang et al. |
| 7,758,427 B2 | 7/2010 | Egozy |
| 7,760,908 B2 | 7/2010 | Curtner et al. |
| 7,772,480 B2 | 8/2010 | Brennan |
| 7,774,706 B2 | 8/2010 | Sakai |
| 7,789,741 B1 | 9/2010 | Fields et al. |
| 7,791,808 B2 | 9/2010 | French et al. |
| 7,797,641 B2 | 9/2010 | Karukka et al. |
| D624,932 S | 10/2010 | Chaudhri |
| 7,806,759 B2 | 10/2010 | McHale et al. |
| 7,814,436 B2 | 10/2010 | Schrag et al. |
| 7,823,070 B2 | 10/2010 | Nelson et al. |
| 7,829,777 B2 | 11/2010 | Kyuma et al. |
| 7,838,755 B2 | 11/2010 | Taub et al. |
| 7,840,288 B2 | 11/2010 | Graepel |
| 7,840,907 B2 | 11/2010 | Kikuchi et al. |
| D628,582 S | 12/2010 | Kurozumi et al. |
| 7,853,896 B2 | 12/2010 | Ok et al. |
| 7,853,897 B2 | 12/2010 | Ogawa et al. |
| 7,855,333 B2 * | 12/2010 | Miyajima et al. ............... 84/612 |
| 7,855,334 B2 * | 12/2010 | Yamashita et al. ............... 84/612 |
| 7,865,834 B1 | 1/2011 | van Os et al. |
| 7,877,690 B2 | 1/2011 | Margulis |
| 7,881,702 B2 | 2/2011 | Heyworth et al. |
| 7,890,867 B1 | 2/2011 | Margulis |
| 7,893,337 B2 | 2/2011 | Lenz |
| 7,895,617 B2 | 2/2011 | Pedlow, Jr. |
| 7,899,389 B2 | 3/2011 | Mangum |
| 7,904,814 B2 | 3/2011 | Errico et al. |
| 7,917,644 B2 | 3/2011 | Vedantham et al. |
| 7,920,931 B2 | 4/2011 | Van de Sluis et al. |
| 7,923,620 B2 | 4/2011 | Foster |
| 7,928,307 B2 | 4/2011 | Hetherington et al. |
| 7,935,880 B2 | 5/2011 | Stoddard et al. |
| 7,949,494 B2 | 5/2011 | Moskowitz et al. |
| 7,973,230 B2 | 7/2011 | Mahowald |
| 7,980,997 B2 | 7/2011 | Thukral et al. |
| 7,982,114 B2 | 7/2011 | Applewhite et al. |
| 8,003,872 B2 | 8/2011 | Lopiccolo et al. |
| 8,010,088 B2 | 8/2011 | Cheng |
| 8,026,435 B2 | 9/2011 | Stoddard et al. |
| 8,057,290 B2 | 11/2011 | Vance et al. |
| D650,802 S | 12/2011 | Jang et al. |
| 8,076,564 B2 | 12/2011 | Applewhite |
| 8,076,574 B2 | 12/2011 | Irmer et al. |
| 8,079,901 B2 | 12/2011 | Brosius et al. |
| 8,079,907 B2 | 12/2011 | Egozy |
| 8,080,722 B2 | 12/2011 | Applewhite et al. |
| D651,608 S | 1/2012 | Allen et al. |
| D651,609 S | 1/2012 | Pearson et al. |
| 8,173,883 B2 * | 5/2012 | Willacy et al. ............... 84/600 |
| 8,176,439 B2 | 5/2012 | Kamen et al. |

(56) References Cited

U.S. PATENT DOCUMENTS

| | | |
|---|---|---|
| 8,198,526 B2 | 6/2012 | Izen et al. |
| 8,202,161 B2 | 6/2012 | Leake et al. |
| 8,205,172 B2 | 6/2012 | Wong et al. |
| 8,209,606 B2 | 6/2012 | Ording |
| 8,214,175 B2 | 7/2012 | Moskowitz et al. |
| 8,225,227 B2 | 7/2012 | Headrick et al. |
| 8,230,360 B2 | 7/2012 | Ma et al. |
| D664,975 S | 8/2012 | Arnold |
| 2001/0004861 A1 | 6/2001 | Suzuki et al. |
| 2001/0007824 A1 | 7/2001 | Fukuda |
| 2001/0007829 A1 | 7/2001 | Suzuki |
| 2001/0008844 A1 | 7/2001 | Yamauchi et al. |
| 2001/0008846 A1 | 7/2001 | Yamauchi et al. |
| 2001/0012795 A1 | 8/2001 | Asami et al. |
| 2001/0014440 A1 | 8/2001 | Oyama et al. |
| 2001/0014620 A1 | 8/2001 | Nobe et al. |
| 2001/0014621 A1 | 8/2001 | Okubo et al. |
| 2001/0016510 A1 | 8/2001 | Ishikawa et al. |
| 2001/0023202 A1 | 9/2001 | Okubo |
| 2001/0024972 A1 | 9/2001 | Kitao |
| 2001/0030652 A1 | 10/2001 | Kitao |
| 2001/0031653 A1 | 10/2001 | Oe et al. |
| 2001/0033287 A1 | 10/2001 | Naegle et al. |
| 2001/0035868 A1 | 11/2001 | Uehara et al. |
| 2001/0036861 A1 | 11/2001 | Uehara et al. |
| 2001/0037181 A1 | 11/2001 | Matsuura et al. |
| 2001/0039207 A1 | 11/2001 | Horigami et al. |
| 2001/0041615 A1 | 11/2001 | Kondo |
| 2002/0002411 A1 | 1/2002 | Higurashi et al. |
| 2002/0002900 A1 | 1/2002 | Cho |
| 2002/0004420 A1 | 1/2002 | Suga et al. |
| 2002/0005109 A1 | 1/2002 | Miller |
| 2002/0006819 A1 | 1/2002 | Kubo et al. |
| 2002/0006823 A1 | 1/2002 | Horio |
| 2002/0013166 A1 | 1/2002 | Yoshitomi |
| 2002/0016203 A1 | 2/2002 | Nagata et al. |
| 2002/0019258 A1 | 2/2002 | Kim et al. |
| 2002/0022520 A1 | 2/2002 | Oe et al. |
| 2002/0022522 A1 | 2/2002 | Yamada |
| 2002/0025841 A1 | 2/2002 | Nobe et al. |
| 2002/0025842 A1 | 2/2002 | Nobe et al. |
| 2002/0025853 A1 | 2/2002 | Kojima et al. |
| 2002/0027899 A1 | 3/2002 | Ikeda |
| 2002/0032054 A1 | 3/2002 | Hosoya |
| 2002/0041385 A1 | 4/2002 | Onodera |
| 2002/0052236 A1 | 5/2002 | Kohira et al. |
| 2002/0054127 A1 | 5/2002 | Omori et al. |
| 2002/0055383 A1 | 5/2002 | Onda et al. |
| 2002/0055386 A1 | 5/2002 | Yotsugi et al. |
| 2002/0061776 A1 | 5/2002 | Wada et al. |
| 2002/0065121 A1 | 5/2002 | Fukunaga et al. |
| 2002/0085833 A1 | 7/2002 | Miyauchi |
| 2002/0091455 A1 | 7/2002 | Williams |
| 2002/0091847 A1 | 7/2002 | Curtin |
| 2002/0094865 A1 | 7/2002 | Araki et al. |
| 2002/0094866 A1 | 7/2002 | Takeda et al. |
| 2002/0105229 A1 | 8/2002 | Tanaka |
| 2002/0119811 A1 | 8/2002 | Yabe et al. |
| 2002/0128736 A1 | 9/2002 | Yoshida et al. |
| 2002/0142818 A1 | 10/2002 | Nakatsuka et al. |
| 2002/0142824 A1 | 10/2002 | Kazaoka et al. |
| 2002/0142827 A1 | 10/2002 | Aida et al. |
| 2002/0142834 A1 | 10/2002 | Sobue |
| 2002/0151337 A1 | 10/2002 | Yamashita et al. |
| 2002/0160824 A1 | 10/2002 | Goto et al. |
| 2002/0169014 A1 | 11/2002 | Egozy et al. |
| 2002/0187835 A1 | 12/2002 | Nakayama et al. |
| 2002/0198045 A1 | 12/2002 | Okubo |
| 2003/0000364 A1 | 1/2003 | Deverich |
| 2003/0003431 A1 | 1/2003 | Maeda |
| 2003/0003991 A1 | 1/2003 | Kuraishi |
| 2003/0003992 A1 | 1/2003 | Furuya |
| 2003/0011620 A1 | 1/2003 | Moriyama |
| 2003/0014262 A1 | 1/2003 | Kim |
| 2003/0017872 A1 | 1/2003 | Oishi et al. |
| 2003/0028598 A1 | 2/2003 | Moller et al. |
| 2003/0032478 A1 | 2/2003 | Takahama et al. |
| 2003/0045334 A1 | 3/2003 | Hosokawa |
| 2003/0069071 A1 | 4/2003 | Britt et al. |
| 2003/0070159 A1 | 4/2003 | Webb |
| 2003/0078086 A1 | 4/2003 | Matsuyama et al. |
| 2003/0078102 A1 | 4/2003 | Okita et al. |
| 2003/0099461 A1 | 5/2003 | Johnson |
| 2003/0104868 A1 | 6/2003 | Okita et al. |
| 2003/0109298 A1 | 6/2003 | Oishi et al. |
| 2003/0151628 A1 | 8/2003 | Salter |
| 2003/0164084 A1 | 9/2003 | Redmann et al. |
| 2003/0195041 A1 | 10/2003 | McCauley |
| 2003/0199317 A1 | 10/2003 | McCauley |
| 2003/0214498 A1 | 11/2003 | Gothard |
| 2003/0218626 A1 | 11/2003 | Greene |
| 2003/0232644 A1 | 12/2003 | Takahashi et al. |
| 2003/0232645 A1 | 12/2003 | Suda et al. |
| 2004/0012540 A1 | 1/2004 | Treibitz et al. |
| 2004/0021684 A1 | 2/2004 | Millner |
| 2004/0054725 A1 | 3/2004 | Moller et al. |
| 2004/0063479 A1 | 4/2004 | Kimura |
| 2004/0063480 A1 | 4/2004 | Wang |
| 2004/0072620 A1 | 4/2004 | Nagata et al. |
| 2004/0077405 A1 | 4/2004 | Watanabe |
| 2004/0082380 A1 | 4/2004 | George et al. |
| 2004/0082386 A1 | 4/2004 | George et al. |
| 2004/0089139 A1 | 5/2004 | Georges et al. |
| 2004/0092303 A1 | 5/2004 | George et al. |
| 2004/0092304 A1 | 5/2004 | George et al. |
| 2004/0092305 A1 | 5/2004 | George et al. |
| 2004/0092306 A1 | 5/2004 | George et al. |
| 2004/0092307 A1 | 5/2004 | George et al. |
| 2004/0092313 A1 | 5/2004 | Saito et al. |
| 2004/0092314 A1 | 5/2004 | George et al. |
| 2004/0093354 A1 | 5/2004 | Xu et al. |
| 2004/0098582 A1 | 5/2004 | Mori |
| 2004/0109000 A1 | 6/2004 | Chosokabe |
| 2004/0113360 A1 | 6/2004 | George et al. |
| 2004/0116069 A1 | 6/2004 | Fadavi-Ardekani et al. |
| 2004/0116184 A1 | 6/2004 | George et al. |
| 2004/0116185 A1 | 6/2004 | George et al. |
| 2004/0123726 A1 | 7/2004 | Kato et al. |
| 2004/0127282 A1 | 7/2004 | Naobayashi |
| 2004/0127291 A1 | 7/2004 | George et al. |
| 2004/0132518 A1 | 7/2004 | Uehara et al. |
| 2004/0132531 A1 | 7/2004 | George et al. |
| 2004/0137984 A1 | 7/2004 | Salter |
| 2004/0152514 A1 | 8/2004 | Kasai et al. |
| 2004/0154460 A1 | 8/2004 | Virolainen et al. |
| 2004/0181592 A1 | 9/2004 | Samra et al. |
| 2004/0186720 A1 | 9/2004 | Kemmochi |
| 2004/0204211 A1 | 10/2004 | Suzuki |
| 2004/0204238 A1 | 10/2004 | Aoki |
| 2004/0205204 A1 | 10/2004 | Chafe |
| 2004/0207774 A1 | 10/2004 | Gothard |
| 2004/0209673 A1 | 10/2004 | Shiraishi |
| 2004/0229685 A1 | 11/2004 | Smith et al. |
| 2004/0236543 A1 | 11/2004 | Stephens |
| 2004/0239678 A1 | 12/2004 | Tsunashima et al. |
| 2004/0243482 A1 | 12/2004 | Laut |
| 2004/0254016 A1 | 12/2004 | Shimazaki |
| 2004/0259631 A1 | 12/2004 | Katz et al. |
| 2004/0259632 A1 | 12/2004 | Crittenden et al. |
| 2004/0259644 A1 | 12/2004 | McCauley |
| 2005/0027381 A1 | 2/2005 | George et al. |
| 2005/0027383 A1 | 2/2005 | Nagata et al. |
| 2005/0045025 A1 | 3/2005 | Wells et al. |
| 2005/0049047 A1 | 3/2005 | Kitao |
| 2005/0059480 A1 | 3/2005 | Soukup et al. |
| 2005/0060231 A1 | 3/2005 | Soukup et al. |
| 2005/0070349 A1 | 3/2005 | Kimura |
| 2005/0070359 A1 | 3/2005 | Rodriquez et al. |
| 2005/0073427 A1 | 4/2005 | Gothard |
| 2005/0075165 A1 | 4/2005 | George et al. |
| 2005/0082559 A1 | 4/2005 | Hasan Zaidi et al. |
| 2005/0101364 A1 | 5/2005 | Onoda et al. |
| 2005/0106546 A1 | 5/2005 | Strom |
| 2005/0115383 A1 | 6/2005 | Chang |

(56) References Cited

U.S. PATENT DOCUMENTS

| | | |
|---|---|---|
| 2005/0120865 A1 | 6/2005 | Tada |
| 2005/0120868 A1 | 6/2005 | Hinman et al. |
| 2005/0143174 A1 | 6/2005 | Goldman et al. |
| 2005/0164779 A1 | 7/2005 | Okuniewicz |
| 2005/0181864 A1 | 8/2005 | Britt et al. |
| 2005/0215319 A1 | 9/2005 | Rigopulos et al. |
| 2005/0221892 A1 | 10/2005 | Takase |
| 2005/0227767 A1 | 10/2005 | Shimomura et al. |
| 2005/0229769 A1 | 10/2005 | Resnikoff |
| 2005/0235809 A1 | 10/2005 | Kageyama |
| 2005/0250565 A1 | 11/2005 | Nojiri et al. |
| 2005/0252362 A1 | 11/2005 | McHale et al. |
| 2005/0255914 A1 | 11/2005 | McHale et al. |
| 2005/0255923 A1 | 11/2005 | Aoki |
| 2005/0273319 A1 | 12/2005 | Dittmar et al. |
| 2006/0003839 A1 | 1/2006 | Lawrence et al. |
| 2006/0009282 A1 | 1/2006 | George et al. |
| 2006/0009979 A1 | 1/2006 | McHale et al. |
| 2006/0026304 A1 | 2/2006 | Price |
| 2006/0030382 A1 | 2/2006 | Okamura et al. |
| 2006/0052161 A1 | 3/2006 | Soukup et al. |
| 2006/0052162 A1 | 3/2006 | Soukup et al. |
| 2006/0052163 A1 | 3/2006 | Aida |
| 2006/0052167 A1 | 3/2006 | Boddicker et al. |
| 2006/0052169 A1 | 3/2006 | Britt et al. |
| 2006/0058099 A1 | 3/2006 | Soukup et al. |
| 2006/0058101 A1 | 3/2006 | Rigopulos |
| 2006/0063573 A1 | 3/2006 | Ishikawa et al. |
| 2006/0068911 A1 | 3/2006 | Pirich et al. |
| 2006/0107819 A1 | 5/2006 | Salter |
| 2006/0107822 A1 | 5/2006 | Bowen |
| 2006/0135253 A1 | 6/2006 | George et al. |
| 2006/0152622 A1 | 7/2006 | Tan et al. |
| 2006/0154710 A1 | 7/2006 | Serafat |
| 2006/0166744 A1 | 7/2006 | Igarashi et al. |
| 2006/0175758 A1 | 8/2006 | Riolo |
| 2006/0180008 A1 | 8/2006 | Negoescu et al. |
| 2006/0189879 A1 | 8/2006 | Miyajima et al. |
| 2006/0191401 A1 | 8/2006 | Ueshima et al. |
| 2006/0204214 A1 | 9/2006 | Shah et al. |
| 2006/0218239 A1 | 9/2006 | Umezawa et al. |
| 2006/0218288 A1 | 9/2006 | Umezawa et al. |
| 2006/0247046 A1 | 11/2006 | Choi et al. |
| 2006/0252503 A1 | 11/2006 | Salter |
| 2006/0258450 A1 | 11/2006 | Ishihata et al. |
| 2006/0266200 A1 | 11/2006 | Goodwin |
| 2006/0287106 A1 | 12/2006 | Jensen |
| 2006/0288842 A1 | 12/2006 | Sitrick et al. |
| 2006/0290810 A1 | 12/2006 | Mallinson |
| 2007/0015571 A1 | 1/2007 | Walker et al. |
| 2007/0026943 A1 | 2/2007 | Yoshimura |
| 2007/0059670 A1 | 3/2007 | Yates |
| 2007/0060312 A1 | 3/2007 | Dempsey et al. |
| 2007/0081562 A1 | 4/2007 | Ma |
| 2007/0088812 A1 | 4/2007 | Clark |
| 2007/0111802 A1 | 5/2007 | Ishihara et al. |
| 2007/0119292 A1 | 5/2007 | Nakamura |
| 2007/0140510 A1 | 6/2007 | Redmann |
| 2007/0155494 A1 | 7/2007 | Wells et al. |
| 2007/0162497 A1 | 7/2007 | Pauws |
| 2007/0163427 A1 | 7/2007 | Rigopulos et al. |
| 2007/0163428 A1 | 7/2007 | Salter |
| 2007/0168415 A1 | 7/2007 | Matahira et al. |
| 2007/0175317 A1 | 8/2007 | Salter |
| 2007/0178973 A1 | 8/2007 | Camhi |
| 2007/0201815 A1 | 8/2007 | Griffin |
| 2007/0218444 A1 | 9/2007 | Konetski et al. |
| 2007/0226293 A1 | 9/2007 | Sakurada et al. |
| 2007/0232374 A1 | 10/2007 | Lopiccolo et al. |
| 2007/0234284 A1 | 10/2007 | Tanner et al. |
| 2007/0234881 A1 | 10/2007 | Takehisa |
| 2007/0234885 A1 | 10/2007 | Schmidt et al. |
| 2007/0243915 A1 | 10/2007 | Egozy et al. |
| 2007/0245881 A1 | 10/2007 | Egozy et al. |
| 2007/0256540 A1 | 11/2007 | Salter |
| 2007/0256541 A1 | 11/2007 | McCauley |
| 2007/0260984 A1 | 11/2007 | Marks et al. |
| 2007/0265095 A1 | 11/2007 | Jonishi |
| 2007/0270223 A1 | 11/2007 | Nonaka et al. |
| 2007/0273700 A1 | 11/2007 | Nash et al. |
| 2007/0297755 A1 | 12/2007 | Holt et al. |
| 2008/0009346 A1 | 1/2008 | Jessop et al. |
| 2008/0026355 A1 | 1/2008 | Petef |
| 2008/0053295 A1 | 3/2008 | Goto et al. |
| 2008/0076497 A1 | 3/2008 | Kiskis et al. |
| 2008/0096654 A1 | 4/2008 | Mondesir et al. |
| 2008/0101762 A1 | 5/2008 | Kellock et al. |
| 2008/0102958 A1 | 5/2008 | Kitamura et al. |
| 2008/0113698 A1 | 5/2008 | Egozy |
| 2008/0113797 A1 | 5/2008 | Egozy |
| 2008/0115657 A1 | 5/2008 | Wakiyama |
| 2008/0125229 A1 | 5/2008 | Jonishi |
| 2008/0146342 A1 | 6/2008 | Harvey et al. |
| 2008/0155421 A1 | 6/2008 | Ubillos et al. |
| 2008/0184870 A1 | 8/2008 | Toivola |
| 2008/0192736 A1 | 8/2008 | Jabri et al. |
| 2008/0200224 A1 | 8/2008 | Parks |
| 2008/0202321 A1 | 8/2008 | Goto et al. |
| 2008/0220864 A1 | 9/2008 | Brosius et al. |
| 2008/0222685 A1 | 9/2008 | McCarthy et al. |
| 2008/0268943 A1 | 10/2008 | Jacob |
| 2008/0273755 A1 | 11/2008 | Hildreth |
| 2008/0276175 A1 | 11/2008 | Kim et al. |
| 2008/0280680 A1 | 11/2008 | Dutilly et al. |
| 2008/0288866 A1 | 11/2008 | Spencer et al. |
| 2008/0289477 A1 | 11/2008 | Salter |
| 2008/0311969 A1 | 12/2008 | Kay et al. |
| 2008/0311970 A1 | 12/2008 | Kay et al. |
| 2009/0010335 A1 | 1/2009 | Harrison et al. |
| 2009/0013253 A1 | 1/2009 | Laefer et al. |
| 2009/0015653 A1 | 1/2009 | Baek |
| 2009/0038467 A1 | 2/2009 | Brennan |
| 2009/0069096 A1 | 3/2009 | Nishimoto |
| 2009/0073117 A1 | 3/2009 | Tsurumi et al. |
| 2009/0075711 A1 | 3/2009 | Brosius et al. |
| 2009/0082078 A1 | 3/2009 | Schmidt et al. |
| 2009/0083281 A1 | 3/2009 | Sarig et al. |
| 2009/0088249 A1 | 4/2009 | Kay et al. |
| 2009/0098918 A1 | 4/2009 | Teasdale et al. |
| 2009/0100992 A1 | 4/2009 | Elion |
| 2009/0104956 A1 | 4/2009 | Kay et al. |
| 2009/0107320 A1* | 4/2009 | Willacy et al. ............. 84/609 |
| 2009/0122146 A1 | 5/2009 | Zalewski et al. |
| 2009/0135135 A1 | 5/2009 | Tsurumi |
| 2009/0158220 A1 | 6/2009 | Zalewski et al. |
| 2009/0165632 A1 | 7/2009 | Rigopulos et al. |
| 2009/0177742 A1 | 7/2009 | Rhoads et al. |
| 2009/0186698 A1 | 7/2009 | Ludden |
| 2009/0188371 A1 | 7/2009 | Chiu et al. |
| 2009/0189775 A1 | 7/2009 | Lashina et al. |
| 2009/0191932 A1 | 7/2009 | Chiu et al. |
| 2009/0215533 A1 | 8/2009 | Zalewski et al. |
| 2009/0222392 A1 | 9/2009 | Martin et al. |
| 2009/0228544 A1 | 9/2009 | Demers et al. |
| 2009/0231425 A1 | 9/2009 | Zalewski |
| 2009/0233714 A1 | 9/2009 | Toro |
| 2009/0241758 A1 | 10/2009 | Neubacker |
| 2009/0258686 A1 | 10/2009 | McCauley et al. |
| 2009/0258700 A1 | 10/2009 | Bright et al. |
| 2009/0258703 A1 | 10/2009 | Brunstetter |
| 2009/0260508 A1 | 10/2009 | Elion |
| 2009/0265668 A1 | 10/2009 | Esser et al. |
| 2009/0282335 A1 | 11/2009 | Alexandersson |
| 2009/0300676 A1 | 12/2009 | Harter, Jr. |
| 2009/0310027 A1 | 12/2009 | Fleming |
| 2009/0317783 A1 | 12/2009 | Noguchi |
| 2009/0318228 A1 | 12/2009 | Hughes |
| 2010/0009749 A1 | 1/2010 | Chrzanowski, Jr. et al. |
| 2010/0009750 A1 | 1/2010 | Egozy et al. |
| 2010/0029386 A1 | 2/2010 | Pitsch et al. |
| 2010/0035688 A1 | 2/2010 | Picunko |
| 2010/0041477 A1 | 2/2010 | Kay et al. |
| 2010/0062405 A1 | 3/2010 | Zboray et al. |
| 2010/0064238 A1 | 3/2010 | Ludwig |

(56) References Cited

U.S. PATENT DOCUMENTS

| | | |
|---|---|---|
| 2010/0080528 A1 | 4/2010 | Yen et al. |
| 2010/0087240 A1 | 4/2010 | Egozy et al. |
| 2010/0100848 A1 | 4/2010 | Ananian et al. |
| 2010/0113117 A1 | 5/2010 | Ku et al. |
| 2010/0120470 A1 | 5/2010 | Kim et al. |
| 2010/0137049 A1 | 6/2010 | Epstein |
| 2010/0144436 A1 | 6/2010 | Marks et al. |
| 2010/0151948 A1 | 6/2010 | Vance et al. |
| 2010/0160038 A1 | 6/2010 | Youm et al. |
| 2010/0161432 A1 | 6/2010 | Kumanov et al. |
| 2010/0186579 A1 | 7/2010 | Schnitman |
| 2010/0192106 A1 | 7/2010 | Watanabe et al. |
| 2010/0209003 A1 | 8/2010 | Toebes et al. |
| 2010/0216598 A1 | 8/2010 | Nicolas et al. |
| 2010/0228740 A1 | 9/2010 | Cannistraro et al. |
| 2010/0245241 A1 | 9/2010 | Kim et al. |
| 2010/0247081 A1 | 9/2010 | Victoria Pons et al. |
| 2010/0255398 A1 | 10/2010 | Jacobson et al. |
| 2010/0255827 A1 | 10/2010 | Jordan et al. |
| 2010/0261146 A1 | 10/2010 | Kim |
| 2010/0265398 A1 | 10/2010 | Johnson et al. |
| 2010/0283723 A1 | 11/2010 | Konishi |
| 2010/0299405 A1 | 11/2010 | Socher et al. |
| 2010/0300264 A1 | 12/2010 | Foster |
| 2010/0300265 A1 | 12/2010 | Foster et al. |
| 2010/0300266 A1 | 12/2010 | Stoddard et al. |
| 2010/0300267 A1 | 12/2010 | Stoddard et al. |
| 2010/0300268 A1 | 12/2010 | Applewhite et al. |
| 2010/0300269 A1 | 12/2010 | Applewhite |
| 2010/0300270 A1 | 12/2010 | Applewhite et al. |
| 2010/0300272 A1 | 12/2010 | Scherf |
| 2010/0304810 A1 | 12/2010 | Stoddard |
| 2010/0304811 A1 | 12/2010 | Schmidt et al. |
| 2010/0304812 A1 | 12/2010 | Stoddard et al. |
| 2010/0304863 A1 | 12/2010 | Applewhite et al. |
| 2010/0304865 A1 | 12/2010 | Picunko et al. |
| 2010/0306655 A1 | 12/2010 | Mattingly et al. |
| 2010/0307321 A1* | 12/2010 | Mann et al. ............ 84/613 |
| 2010/0319517 A1* | 12/2010 | Savo et al. ............ 84/609 |
| 2011/0010667 A1 | 1/2011 | Sakai et al. |
| 2011/0021273 A1 | 1/2011 | Buckley et al. |
| 2011/0028214 A1 | 2/2011 | Bright et al. |
| 2011/0039659 A1 | 2/2011 | Kim et al. |
| 2011/0047471 A1 | 2/2011 | Lord et al. |
| 2011/0066940 A1 | 3/2011 | Asghari Kamrani et al. |
| 2011/0098106 A1 | 4/2011 | He et al. |
| 2011/0098109 A1 | 4/2011 | Leake et al. |
| 2011/0118621 A1 | 5/2011 | Chu |
| 2011/0140931 A1 | 6/2011 | Geurts et al. |
| 2011/0151975 A1 | 6/2011 | Mori |
| 2011/0159938 A1 | 6/2011 | Umeda |
| 2011/0185309 A1 | 7/2011 | Challinor et al. |
| 2011/0195779 A1 | 8/2011 | Lau |
| 2011/0197740 A1 | 8/2011 | Chang et al. |
| 2011/0237324 A1 | 9/2011 | Clavin et al. |
| 2011/0238676 A1 | 9/2011 | Liu et al. |
| 2011/0251840 A1 | 10/2011 | Cook et al. |
| 2011/0256929 A1 | 10/2011 | Dubrofsky et al. |
| 2011/0257771 A1 | 10/2011 | Bennett et al. |
| 2011/0283236 A1 | 11/2011 | Beaumier et al. |
| 2011/0306396 A1 | 12/2011 | Flury et al. |
| 2011/0306397 A1 | 12/2011 | Fleming et al. |
| 2011/0306398 A1 | 12/2011 | Boch et al. |
| 2011/0312397 A1 | 12/2011 | Applewhite et al. |
| 2011/0312415 A1 | 12/2011 | Booth et al. |
| 2012/0013493 A1 | 1/2012 | Kato |
| 2012/0021833 A1 | 1/2012 | Boch et al. |
| 2012/0052947 A1 | 3/2012 | Yun |
| 2012/0063617 A1 | 3/2012 | Ramos |
| 2012/0069131 A1 | 3/2012 | Abelow |
| 2012/0094730 A1 | 4/2012 | Egozy |
| 2012/0108305 A1 | 5/2012 | Akiyama et al. |
| 2012/0108334 A1 | 5/2012 | Tarama et al. |
| 2012/0143358 A1 | 6/2012 | Adams et al. |

FOREIGN PATENT DOCUMENTS

| | | |
|---|---|---|
| AU | 200194329 | 10/2001 |
| AU | 2003285918 A1 | 5/2004 |
| AU | 2010229693 A1 | 11/2011 |
| CA | 2587415 A1 | 5/2005 |
| CA | 2609587 A1 | 12/2005 |
| CA | 2720723 A1 | 11/2009 |
| CA | 2757238 A1 | 9/2010 |
| CA | 2760210 A1 | 12/2010 |
| DE | 19716937 A1 | 3/1998 |
| DE | 69804915 T2 | 5/2002 |
| DE | 69726507 T2 | 11/2004 |
| DE | 69832379 T2 | 8/2006 |
| DE | 69739885 | 7/2010 |
| EP | 0903169 A2 | 3/1999 |
| EP | 919267 A2 | 6/1999 |
| EP | 972550 A2 | 1/2000 |
| EP | 974382 A1 | 1/2000 |
| EP | 974954 A1 | 1/2000 |
| EP | 978301 A1 | 2/2000 |
| EP | 982055 A1 | 3/2000 |
| EP | 992928 A2 | 4/2000 |
| EP | 992929 A2 | 4/2000 |
| EP | 993847 A1 | 4/2000 |
| EP | 0997870 A1 | 5/2000 |
| EP | 1003130 A2 | 5/2000 |
| EP | 1022672 A1 | 7/2000 |
| EP | 1029565 A2 | 8/2000 |
| EP | 1029566 A2 | 8/2000 |
| EP | 1029570 A2 | 8/2000 |
| EP | 1029571 A2 | 8/2000 |
| EP | 1031363 A2 | 8/2000 |
| EP | 1031904 A2 | 8/2000 |
| EP | 1033157 A2 | 9/2000 |
| EP | 1033158 A2 | 9/2000 |
| EP | 1043745 A1 | 10/2000 |
| EP | 1043746 A1 | 10/2000 |
| EP | 1048330 A2 | 11/2000 |
| EP | 1061501 A1 | 12/2000 |
| EP | 1064974 A2 | 1/2001 |
| EP | 1064975 A2 | 1/2001 |
| EP | 1066866 A2 | 1/2001 |
| EP | 1079368 A1 | 2/2001 |
| EP | 1 081 680 A1 | 3/2001 |
| EP | 1081679 A1 | 3/2001 |
| EP | 1082981 A2 | 3/2001 |
| EP | 1082982 A2 | 3/2001 |
| EP | 1082983 A2 | 3/2001 |
| EP | 1088573 A2 | 4/2001 |
| EP | 1 096 468 A2 | 5/2001 |
| EP | 1114659 A2 | 7/2001 |
| EP | 1122703 A2 | 8/2001 |
| EP | 1125607 A2 | 8/2001 |
| EP | 1125613 A2 | 8/2001 |
| EP | 1127599 A2 | 8/2001 |
| EP | 1130569 A2 | 9/2001 |
| EP | 1132889 A2 | 9/2001 |
| EP | 1134723 A2 | 9/2001 |
| EP | 1136107 A2 | 9/2001 |
| EP | 1138357 A1 | 10/2001 |
| EP | 1139293 A2 | 10/2001 |
| EP | 1145744 A2 | 10/2001 |
| EP | 1145745 A2 | 10/2001 |
| EP | 1145748 A2 | 10/2001 |
| EP | 1145749 A2 | 10/2001 |
| EP | 1150276 A2 | 10/2001 |
| EP | 1151770 A2 | 11/2001 |
| EP | 1151773 A2 | 11/2001 |
| EP | 1157723 A2 | 11/2001 |
| EP | 1159992 A2 | 12/2001 |
| EP | 1160762 A2 | 12/2001 |
| EP | 1161974 A2 | 12/2001 |
| EP | 1 174 856 A2 | 1/2002 |
| EP | 1170041 A2 | 1/2002 |
| EP | 1178427 A1 | 2/2002 |
| EP | 1184061 A1 | 3/2002 |
| EP | 1187427 A2 | 3/2002 |
| EP | 1192976 A2 | 4/2002 |

(56) References Cited

FOREIGN PATENT DOCUMENTS

| | | | |
|---|---|---|---|
| EP | 1195721 A2 | 4/2002 |
| EP | 1197947 A2 | 4/2002 |
| EP | 1199702 A2 | 4/2002 |
| EP | 1199703 A2 | 4/2002 |
| EP | 1 201 277 A2 | 5/2002 |
| EP | 1206950 A2 | 5/2002 |
| EP | 1208885 A1 | 5/2002 |
| EP | 1214959 A2 | 6/2002 |
| EP | 1220539 A2 | 7/2002 |
| EP | 1228794 A2 | 8/2002 |
| EP | 1245255 A2 | 10/2002 |
| EP | 1249260 A2 | 10/2002 |
| EP | 1258274 A2 | 11/2002 |
| EP | 1264622 A2 | 12/2002 |
| EP | 1270049 A2 | 1/2003 |
| EP | 1270050 A2 | 1/2003 |
| EP | 1271294 A2 | 1/2003 |
| EP | 1279425 A2 | 1/2003 |
| EP | 1287864 A2 | 3/2003 |
| EP | 1306112 A1 | 5/2003 |
| EP | 1413340 A1 | 4/2004 |
| EP | 1503365 A1 | 2/2005 |
| EP | 1533010 A1 | 5/2005 |
| EP | 1542132 A1 | 6/2005 |
| EP | 1552864 A1 | 7/2005 |
| EP | 1552865 A1 | 7/2005 |
| EP | 1569171 A1 | 8/2005 |
| EP | 1604711 A1 | 12/2005 |
| EP | 1609513 A1 | 12/2005 |
| EP | 1630746 A1 | 3/2006 |
| EP | 1666109 A1 | 6/2006 |
| EP | 1696385 A2 | 8/2006 |
| EP | 1699017 A2 | 9/2006 |
| EP | 1731204 A1 | 12/2006 |
| EP | 1743680 A1 | 1/2007 |
| EP | 1 758 387 A1 | 2/2007 |
| EP | 1 825 896 A1 | 8/2007 |
| EP | 00859418-0008 | 2/2008 |
| EP | 000890447-0040 | 4/2008 |
| EP | 000890447-0046 | 4/2008 |
| EP | 2000190 A2 | 12/2008 |
| EP | 2001569 A2 | 12/2008 |
| EP | 2027577 A1 | 2/2009 |
| EP | 2206539 A1 | 7/2010 |
| EP | 2206540 A1 | 7/2010 |
| EP | 2301253 A1 | 3/2011 |
| EP | 2411101 A2 | 2/2012 |
| EP | 2494432 A2 | 9/2012 |
| FI | 200705530 | 1/2009 |
| FI | 20096276 | 12/2009 |
| GB | 2118809 A | 11/1983 |
| GB | 2425730 A | 11/2006 |
| GB | 2465918 A | 6/2010 |
| GB | 2471871 A | 1/2011 |
| HK | 1018021 A1 | 10/2002 |
| HK | 1023734 A1 | 2/2006 |
| IT | IN01685CN201 | 1/2012 |
| JP | 7185131 A | 7/1995 |
| JP | 3014386 B1 | 8/1995 |
| JP | 2552427 Y2 | 11/1996 |
| JP | 11053563 A | 2/1999 |
| JP | 11128534 A | 5/1999 |
| JP | 11128535 A | 5/1999 |
| JP | 11151380 A | 6/1999 |
| JP | 11156054 A | 6/1999 |
| JP | 2922509 | 7/1999 |
| JP | 11219443 A | 8/1999 |
| JP | 2951948 B1 | 9/1999 |
| JP | 2982147 B1 | 11/1999 |
| JP | 11313979 A | 11/1999 |
| JP | 3003851 U | 1/2000 |
| JP | 2000014931 | 1/2000 |
| JP | 2000037490 | 2/2000 |
| JP | 3017986 B1 | 3/2000 |
| JP | 3031676 B1 | 4/2000 |
| JP | 2000107447 A | 4/2000 |
| JP | 2000107458 | 4/2000 |
| JP | 2000112485 A | 4/2000 |
| JP | 2000116938 A | 4/2000 |
| JP | 3053090 B1 | 6/2000 |
| JP | 2000157723 | 6/2000 |
| JP | 3066528 U | 7/2000 |
| JP | 2000218046 | 8/2000 |
| JP | 3088409 B2 | 9/2000 |
| JP | 2000237454 A | 9/2000 |
| JP | 2000237455 A | 9/2000 |
| JP | 2000245957 | 9/2000 |
| JP | 2000245964 A | 9/2000 |
| JP | 2000245967 | 9/2000 |
| JP | 2000250534 | 9/2000 |
| JP | 2000/288254 | 10/2000 |
| JP | 2000293292 A | 10/2000 |
| JP | 2000293294 A | 10/2000 |
| JP | 2000300838 A | 10/2000 |
| JP | 2000300851 A | 10/2000 |
| JP | 2000308759 A | 11/2000 |
| JP | 2000317144 A | 11/2000 |
| JP | 2000325665 A | 11/2000 |
| JP | 2000350861 A | 12/2000 |
| JP | 2001000610 A | 1/2001 |
| JP | 2001009149 A | 1/2001 |
| JP | 2001009152 A | 1/2001 |
| JP | 2001009157 A | 1/2001 |
| JP | 2001046739 A | 2/2001 |
| JP | 2001062144 A | 3/2001 |
| JP | 2001070637 A | 3/2001 |
| JP | 2001070640 A | 3/2001 |
| JP | 2001070652 A | 3/2001 |
| JP | 2001075579 A | 3/2001 |
| JP | 2001096059 A | 4/2001 |
| JP | 2001096061 A | 4/2001 |
| JP | 2001129244 A | 5/2001 |
| JP | 2001145777 A | 5/2001 |
| JP | 2001145778 A | 5/2001 |
| JP | 3179769 B2 | 6/2001 |
| JP | 2001162049 A | 6/2001 |
| JP | 2001170352 A | 6/2001 |
| JP | 2001175254 A | 6/2001 |
| JP | 3187758 B2 | 7/2001 |
| JP | 2001190834 A | 7/2001 |
| JP | 2001190835 A | 7/2001 |
| JP | 2001190844 A | 7/2001 |
| JP | 2001198351 A | 7/2001 |
| JP | 2001198352 A | 7/2001 |
| JP | 2001198354 A | 7/2001 |
| JP | 3202733 B2 | 8/2001 |
| JP | 2001212369 A | 8/2001 |
| JP | 2001218980 A | 8/2001 |
| JP | 2001222280 A | 8/2001 |
| JP | 2001224850 A | 8/2001 |
| JP | 2001231904 A | 8/2001 |
| JP | 2001232059 A | 8/2001 |
| JP | 2001232062 A | 8/2001 |
| JP | 2001-252470 | 9/2001 |
| JP | 3204652 B2 | 9/2001 |
| JP | 2001252467 A | 9/2001 |
| JP | 2001259224 A | 9/2001 |
| JP | 2001269482 A | 10/2001 |
| JP | 2001273517 A | 10/2001 |
| JP | 2001293246 | 10/2001 |
| JP | 2001293254 A | 10/2001 |
| JP | 2001293256 A | 10/2001 |
| JP | 2001299975 A | 10/2001 |
| JP | 2001312260 A | 11/2001 |
| JP | 2001312740 A | 11/2001 |
| JP | 2001314645 A | 11/2001 |
| JP | 2001321565 A | 11/2001 |
| JP | 2001344049 A | 12/2001 |
| JP | 2001353374 A | 12/2001 |
| JP | 3245139 B2 | 1/2002 |
| JP | 2002000936 A | 1/2002 |
| JP | 2002018123 A | 1/2002 |
| JP | 2002018134 A | 1/2002 |
| JP | 2002028368 A | 1/2002 |

(56) References Cited

FOREIGN PATENT DOCUMENTS

| | | |
|---|---|---|
| JP | 3258647 B2 | 2/2002 |
| JP | 3261110 B2 | 2/2002 |
| JP | 2002045567 A | 2/2002 |
| JP | 2002056340 A | 2/2002 |
| JP | 2002066127 A | 3/2002 |
| JP | 2002066128 A | 3/2002 |
| JP | 2002084292 A | 3/2002 |
| JP | 3270928 B2 | 4/2002 |
| JP | 2002116752 A | 4/2002 |
| JP | 2002140727 A | 5/2002 |
| JP | 2002143567 A | 5/2002 |
| JP | 2002153673 A | 5/2002 |
| JP | 3306021 B2 | 7/2002 |
| JP | 2002204426 A | 7/2002 |
| JP | 3310257 B2 | 8/2002 |
| JP | 3317686 B2 | 8/2002 |
| JP | 3317956 B2 | 8/2002 |
| JP | 2002224435 A | 8/2002 |
| JP | 2002239223 A | 8/2002 |
| JP | 2002239233 A | 8/2002 |
| JP | 3320700 B2 | 9/2002 |
| JP | 3321111 B2 | 9/2002 |
| JP | 2002263229 A | 9/2002 |
| JP | 3333773 B2 | 10/2002 |
| JP | 3338005 B2 | 10/2002 |
| JP | 2002282417 A | 10/2002 |
| JP | 2002282418 A | 10/2002 |
| JP | 2002292123 A | 10/2002 |
| JP | 2002292139 A | 10/2002 |
| JP | 2002301263 A | 10/2002 |
| JP | 3345591 B2 | 11/2002 |
| JP | 3345719 B2 | 11/2002 |
| JP | 2002325975 A | 11/2002 |
| JP | 3351780 B2 | 12/2002 |
| JP | 2002360937 A | 12/2002 |
| JP | 3361084 B2 | 1/2003 |
| JP | 3370313 B2 | 1/2003 |
| JP | 3371132 B2 | 1/2003 |
| JP | 2003000951 A | 1/2003 |
| JP | 2003010541 A | 1/2003 |
| JP | 2003010542 A | 1/2003 |
| JP | 2003019346 A | 1/2003 |
| JP | 2003030686 A | 1/2003 |
| JP | 2003058317 A | 2/2003 |
| JP | 3392833 B2 | 3/2003 |
| JP | 2003117233 A | 4/2003 |
| JP | 2003126548 A | 5/2003 |
| JP | 3417555 B2 | 6/2003 |
| JP | 3417918 B2 | 6/2003 |
| JP | 3420221 B2 | 6/2003 |
| JP | 2003175279 A | 6/2003 |
| JP | 3425548 B2 | 7/2003 |
| JP | 3425552 B2 | 7/2003 |
| JP | 3433918 B2 | 8/2003 |
| JP | 3439187 B2 | 8/2003 |
| JP | 2003236244 A | 8/2003 |
| JP | 3442730 B2 | 9/2003 |
| JP | 3448043 B2 | 9/2003 |
| JP | 2003256552 A | 9/2003 |
| JP | 3458090 B2 | 10/2003 |
| JP | 3470119 B2 | 11/2003 |
| JP | 2003334387 A | 11/2003 |
| JP | 3491759 B1 | 1/2004 |
| JP | 2004016315 A | 1/2004 |
| JP | 2004016388 A | 1/2004 |
| JP | 3496874 B2 | 2/2004 |
| JP | 3500379 B1 | 2/2004 |
| JP | 3500383 B1 | 2/2004 |
| JP | 2004033266 A | 2/2004 |
| JP | 2004097610 A | 4/2004 |
| JP | 2004105309 A | 4/2004 |
| JP | 2004121397 A | 4/2004 |
| JP | 3526302 B1 | 5/2004 |
| JP | 2004141261 A | 5/2004 |
| JP | 3534345 B1 | 6/2004 |
| JP | 2004164519 A | 6/2004 |
| JP | 2004166994 A | 6/2004 |
| JP | 3545755 B2 | 7/2004 |
| JP | 3545983 B2 | 7/2004 |
| JP | 3546206 B2 | 7/2004 |
| JP | 3547374 B2 | 7/2004 |
| JP | 2004192069 A | 7/2004 |
| JP | 2004201937 A | 7/2004 |
| JP | 3561456 B2 | 9/2004 |
| JP | 3566195 B2 | 9/2004 |
| JP | 3573288 B2 | 10/2004 |
| JP | 3576994 B2 | 10/2004 |
| JP | 3582716 B2 | 10/2004 |
| JP | 2004283249 A | 10/2004 |
| JP | 2004298469 A | 10/2004 |
| JP | 2004321245 A | 11/2004 |
| JP | 3597465 B2 | 12/2004 |
| JP | 2004337256 A | 12/2004 |
| JP | 3611807 B2 | 1/2005 |
| JP | 2005046445 A | 2/2005 |
| JP | 2005049913 A | 2/2005 |
| JP | 3626711 B2 | 3/2005 |
| JP | 3634273 B2 | 3/2005 |
| JP | 2005095440 A | 4/2005 |
| JP | 3656118 B2 | 6/2005 |
| JP | 3686906 B2 | 8/2005 |
| JP | 3699660 B2 | 9/2005 |
| JP | 2005261586 A | 9/2005 |
| JP | 3702269 B2 | 10/2005 |
| JP | 2005287830 A | 10/2005 |
| JP | 2005301578 A | 10/2005 |
| JP | 3715513 B2 | 11/2005 |
| JP | 2005319025 A | 11/2005 |
| JP | 3727275 B2 | 12/2005 |
| JP | 2006020758 A | 1/2006 |
| JP | 3753425 B2 | 3/2006 |
| JP | 2006075264 A | 3/2006 |
| JP | 2006116046 A | 5/2006 |
| JP | 2006116047 A | 5/2006 |
| JP | 2006192157 A | 7/2006 |
| JP | 3804939 B2 | 8/2006 |
| JP | 3816931 B2 | 8/2006 |
| JP | 3822887 B2 | 9/2006 |
| JP | 3831695 B2 | 10/2006 |
| JP | 3869175 B2 | 1/2007 |
| JP | 2007029589 A | 2/2007 |
| JP | 3890445 B2 | 3/2007 |
| JP | 2007504901 A | 3/2007 |
| JP | 2008018287 A | 1/2008 |
| JP | 2008168143 A | 7/2008 |
| JP | 2009531153 A | 9/2009 |
| JP | 2010509000 A | 3/2010 |
| KR | 20010027533 A | 4/2001 |
| KR | 20050047024 A | 5/2005 |
| RU | 2010146213 A | 5/2012 |
| SG | 173496 A1 | 9/2011 |
| TW | 340049 | 3/2009 |
| TW | 200951764 A | 12/2009 |
| TW | 201006526 A | 2/2010 |
| TW | 322023 | 3/2010 |
| TW | 201116318 A | 5/2011 |
| WO | WO-9717598 A1 | 5/1997 |
| WO | WO-9938588 A1 | 8/1999 |
| WO | WO-01/63592 A2 | 8/2001 |
| WO | WO-0163592 | 8/2001 |
| WO | WO-0230535 A1 | 4/2002 |
| WO | WO-2004002590 A1 | 1/2004 |
| WO | WO-2004002594 A1 | 1/2004 |
| WO | WO-2004024256 A1 | 3/2004 |
| WO | WO-2004024263 A1 | 3/2004 |
| WO | WO-2004027631 A1 | 4/2004 |
| WO | WO-2004030779 A1 | 4/2004 |
| WO | WO-2004039055 A2 | 5/2004 |
| WO | WO-2004052483 A1 | 6/2004 |
| WO | WO-2004053800 A1 | 6/2004 |
| WO | WO-2004082786 A1 | 9/2004 |
| WO | WO-2004087272 A1 | 10/2004 |
| WO | WO-2004101093 A1 | 11/2004 |
| WO | WO-2004107270 A1 | 12/2004 |

(56) References Cited

FOREIGN PATENT DOCUMENTS

| WO | WO-2005027062 A1 | 3/2005 |
|---|---|---|
| WO | WO-2005027063 A1 | 3/2005 |
| WO | WO-2005030354 A1 | 4/2005 |
| WO | WO-2005039212 A1 | 4/2005 |
| WO | WO-2005099842 A1 | 10/2005 |
| WO | WO-2005107902 A1 | 11/2005 |
| WO | WO-2005/113096 A1 | 12/2005 |
| WO | WO-2005114648 A1 | 12/2005 |
| WO | WO-2006006274 A1 | 1/2006 |
| WO | WO-2006075494 A1 | 7/2006 |
| WO | WO-2007/055522 A1 | 5/2007 |
| WO | WO-2007070738 A2 | 6/2007 |
| WO | WO-2007078639 | 7/2007 |
| WO | WO-2007/115299 A2 | 10/2007 |
| WO | WO-2007111247 A1 | 10/2007 |
| WO | WO-2007130582 A2 | 11/2007 |
| WO | WO-2008001088 A2 | 1/2008 |
| WO | WO-2008145952 A1 | 12/2008 |
| WO | WO-2009021124 A2 | 2/2009 |
| WO | WO-2010018485 A1 | 2/2010 |
| WO | WO-2010036989 A1 | 4/2010 |
| WO | WO-2011067469 A1 | 6/2011 |
| WO | WO-2011155958 A1 | 12/2011 |

OTHER PUBLICATIONS

[Video] "E3 2010 Live Demo", where Ubi talked about MJ:TE for Kinect (<http://www.gametrailers.com/video/e3-2010-michael-jackson/101449>) Last accessed Nov. 8, 2012.

[Video] MJ the Experience Kinect: release Apr. 2011, http//www.youtube.com/watch?v=N7oyxHIP48A.

[Video] 'Don't Stop' Gameplay Trailer: <http://www.gametrailers.com/video/dont-stop-michael-jackson/707336> (Nov. 10, 2010).

[Video] 'Ghosts' Gameplay Trailer: <http://www.gametrailers.com/video/ghosts-gameplay-michael-jackson/706825> (Oct. 27, 2010).

[Video] Dance Summit 2001: Bust a Groove (Released Nov. 2, 2000 for PS2); <http://www.youtube.com/watch?v=E8NjTGHYQcM>.

[Video] Dancing With the Stars—Activision, Zoe Mode; <http://www.youtube.com/watch?v=C7zBVfEJ0gg> (Oct. 2007).

[Video] Dancing with the Stars: We Dance—Activision, Zoe Mode; <http://www.youtube.com/watch?v=3IG0b-CT8vs> Oct. 2008.

[Video] DDR Hottest Party; <http://www.youtube.com/watch?v=zk20hEzGmUY> (Sep. 2007).

[Video] E3 2010 Live Demo <http://www.gametrailers.com/video/e3-2010-michael-jackson/101449>; (Jun. 14, 2010).

[Video] Eyetoy Groove for PS2; <http://www.youtube.com/watch?v=c80aaOU_fuE> (Apr. 2004).

[Video] Gamescom '10—Billie Jean Demo <http://www.gametrailers.com/video/gc-10-michael-jackson/703294>(:58-1:13) (Aug. 20, 2010).

[Video] Gamescom '10—Working Day and Night Demo <http://www.gametrailers.com/video/gc-10-michael-jackson/703295> (Aug. 20, 2010).

[Video] Grease Dance—505 Games: release—Oct. 2011 (http://www.youtube.com/watch?v=PaGBHSB2urg).

[Video] Hannah Montana: Spotlight World Tour (Released Nov. 6, 2007 for Wii); <http://www.youtube.com/watch?v=WtyuU2NaL3Q>.

[Video] Britney's Dance Beat (Released May 8, 2002 for PS2); <http://www.youtube.com/watch?v=-KR1dRGNX_w>.

[Video] Dance Dance Revolution: Hottest Party 3 (Released Sep. 27, 2009 for Wii) <http://www.youtube.com/watch?v=zk20hEzGmUY>.

[Video] Dance on Broadway—Ubisoft, Longtail Studios; <http://www.youtube.com/watch?v=eYaP-dT4z-M> (Jun. 6, 2010).

[Video] Dance on Broadway: Jun. 2010 (http://youtu.be/Wi9Y5HHcvtY).

[Video] Dancing with the Stars: Oct. 2007 (http://www.youtube.com/watch?v=8UChGv2v5DI).

Amplitude for Playstation. Retrieved from the Internet: www.target.com/gp/detail.hbnl/601-0682676-9911341?asin=B0000859TM&AFID. Retrieved on Feb. 22, 2005. 1 page.

Amplitude Review by Ryan Davis. Retrieved from the Internet: www.gamespot.com/ps2/puzzle/ampli~de /printable_6023980.html. Retrieved on Jun. 11, 2012. 10 pages.

Amplitude. Retrieved from the Internet: www.gamesquestdirect.com/71171972582.html. Retrieved on Jun. 8, 2012. 2 pages.

Amplitude: Sony's Rocking Rhythm Garhe Outdoes Itself on All Fronts by Douglass C. Perry. Retrieved from the Internet: http://ps2.ign.com/articles/390/390620pl.thml. Feb. 22, 2005. 6 pages.

Association of British Scrabble Players. "Rolling System" ABSP, http://www.absp.org.uk/results/ratings_detail.shtml. Retrieved May 25, 2011 (4 pages).

Beat Planet Music (Import) Review by Christian Nutt. Retrieved from the Internet: www.gamespot.com/ps/ action/beatplanetmusiclprintable_2546762.html. Retrieved on Jun. 11, 2012. 3 pages.

Beatmania IIDX 9 Style. Retrieved from the Internet: www.play-asia.com/paOS-13-71-8-iu.html. Retrieved on Feb. 22, 2005. 2 pages.

Beatmania PlayStation Review from www.GamePro.com/sony/psx/games/reviews/89.shtml. Retrieved on Feb. 22, 2005. 1 page.

Beatmania Review. Retrieved from the Internet: www.gamesarefun.com/gamesdb/review. h?reviewid=294. Retrieved on Jun. 11, 2012. 1 page.

Beatmanla IIDX 7 Style. Retrieved from the Internet: www.lik-sang.com/Info.php?category=27&products id=4061. Retrieved on Feb. 22, 2005. 1 page.

Beatnik Patent Sale Offering, Nov. 2008 (81 pp).

Bishop, Sam; Frequency: If you decide to pick up this game, you better give up ont he idea of getting a full night of sleep. via www.ign.com [online], Nov. 26, 2001 [retrieved on Mar. 1, 2006]. Retrieved from the Internet <URL: http://ps2.ign.com/articles/166/166450p1.html>. Retrieved on Jun. 8, 2012. 8 pages.

Bust a Groove Review by Jeff Gerstmann. Retrieved from the Internet: www.gamespolcom/ps/puzzlelbusta groove/printable_2546923.html. Retrieved on Jun. 11, 2012. 9 pages.

Bust a Groove. Retrieved from the Internet: www.buyritegames.com/product_information.asp?rc=frgl&number=PS-BUSTA2. Retrieved on Feb. 22, 2005. 1 page.

Bust a Groove. Retrieved from the Internet: www.estarland.com/index.asp?page=Piaystation&cat=F&oroduct=6257&q. Retrieved on Jun. 11, 2012. 2 pages.

Bust a Groove: 989 Studios Best Game of the Year is a Funky Dance Sim thars Got the Fever by Doug Peny. Retrieved from the Internet http://psx.com/articles/152/152308pl.html. Retrieved on Jun. 8, 2012. 5 pages.

Dance Dance Revolution Review by Andy Chien. Retrieved from the Internet www.gamingage.com/reviews /archive/old reviews/psx/ddr. Retrieved on Feb. 22, 2005. 3 pages.

Dance Dance Revolution Review by Ryan Davis. Retrieved from the Internet www.gamespolcom/ps/puzzJe /dancedancerevolutionfprintable_2699724.html. Retrieved on Jun. 11, 2012. 9 pages.

Dance Dance Revolution, Konami via wvvw.ign.com [online], Apr. 4, 2001 [retrieved on Mar. 1, 2006]. Retrieved from the Internet <URL: http://psx.ign.com/articles/161/161525p1.html>. Retrieved on Jun. 14, 2012. 7 pages.

Dance Dance Revolution. Retrieved from the Internet: www.ebgames.com/ebxlproduct/224 7 89.asp. Retrieved on Feb. 22, 2005. 2 pages.

Dancing with the Stars Game Manual (1 page) No date available.

Dave H, et al. StepMania Tutorial. Nov. 3, 2004. <http://web.archive.org/web/200411031145^/vww.stepmania.conVstepmania/wiki.php?pagename=Tutorial>. Retrieved on Jun. 19, 2012. 7 pages.

Def Jam Vendetta Review by Alex Navarro. Retrieved from the Internet www.gamespot.com/ps2/actionf actionfdefjamvendetta/printable_6024297 .html. Retrieved on Jun. 11, 2012. 10 pages.

Def Jam Vendetta. Retrieved from the Internet www.ebgames.com/ebxlproduct/232378.asp. Retrieved on Feb. 22, 2005. 2 pages.

Def Jam Vendetta: Rapper's Delight or Fight-Night Fright? Smash Sumthin' and Find Out by Jon Robinson. Mar. 31, 2003. Retrieved

(56) References Cited

OTHER PUBLICATIONS from the Internet http://ps2.ign.com/articles/391/391713pl.html. Retrieved on Jun. 8, 2012. 6 pages.
Digital Play: Reloaded. Opening Reception. Museum of the Moving Image. Mar. 19, 2005. <http://web.archive.Org/web/20050319060247/http://www.movingimage.us/site/screenings/contenV2005/digital_play_reloaded.ht ml>. 1 page.
Donkey Konga Review by Ryan Davis. Retrieved from the Internet: www.gamespot.com/gamecubelpuzzle/ donkeykonga/printable_6108977.html. Retrieved on Jun. 11, 2012. 11 pages.
Donkey Konga. Retrieved from the Internet: www.ebgames.com/ebxlproducV244024.asp. Retrieved on Jun. 11, 2012. 2 pages.
Donkey Konga: Could a Game Featuring Donkey Kong and Mini-Bongos ever Fail? Our Ful Review by Juan Castro. Retrieved from the Internet: cube.ign.com/articles/550/550723pl.html. Retrieved on Jun. 8, 2012. 6 pages.
DrumMana w/ Drum Set. Retrieved from the Internet www.estarland.com/index.asp?page=Playstation2&cat=RD&product=181268 &q. Retrieved on Jun. 11, 2012. 2 pages.
DrumMania (Import) Review by Jeff Garstmann. Retrieved from the Internet: www.gamespot.com/ps2/actionf drummania/prinlable_2546356.html. Retrieved on Jun. 11, 2012. 9 pages.
DrumMania OST. Retrieved from the Internet www.lik-sang.corn/info/php?category=264&products id=4793. Retrieved on Feb. 22, 2005. 2 pages.
DrumMania Review by Wynfwad. Retrieved from the Internet www.gamefaqs.com/console/ps2/review/ R56573.html. Retrieved on Jun. 11, 2012. 2 pages.
ESRB Game Ratings: Game Rating & Descriptor Guide' via www.esrb.org[online], Retrived from the Internet: <URL: http:/Arvww.esrb.org/esrbratings_guide.asp#symbols>. Retrieved on Jun. 14, 2012. 3 pages.
Eye Toy Groove with Camera (Playstation 2). Retrieved from the Internet www.jr.com/JRProductPage.process?ProductCode=PS2+97400&JRSource=google. Retrieved on Feb. 22, 2005. 1 page.
Eye Toy Groove with Eye Toy Camera PS2. Retrieved from the Internet: www.walmart.com/catalog/product.gsp?dest=9999999997&product id-2607013&s. Retrieved on Feb. 22, 2005. 1 page.
Eye Toy: Groove—The Little Camera That Could comes Back with a Few New Tricks by Ed Lewis. Retrieved from the Internet: ht^y/ps2.ign.corn/artjcles/507/507854pl.html. Retrieved on Jun. 8, 2012. 4 pages
Eye Toy: Groove Review by Ryan Davis. Retrieved from the Internet: wvm.gamespot.com/ps2/puzzle/ eyetoygroove/printable_6094754.html. Retrieved on Jun. 11, 2012. 10 pages.
Frequency—Pre-Played. Retrieved from the Internet www.ebgames.com/ebx/product/203370.asp. Retrieved on Feb. 22, 2005. 2 pages.
Frequency PS2 Review from GamePro.com, written by Dan Electro on Nov. 26, 2001. Retrieved from the Internet: www.gamepro.com/sony/ps2/games/reviews/18464.shtml. Retrieved on Jun. 11, 2012. 2 pages.
Frequency PS2. Retrieved from the Internet: www.walmart.com/catalog/producLgsp7dests9999999997&product id=1635738&s. Retrieved on Feb. 22, 2005. 2 pages.
Frequency Review by Ryan Davis. Retrieved from the Internet:www.gamespot.com/ps2/puzzle/frequency/ printable 2827476.html. Retrieved on Jun. 19, 2012. 9 pages.
Get on Da Mic Overview by Matt Gonzales. Retrieved from the Internet www.gamechronides.com/reviews/ ps2/getondamic/body.htm. Retrieved on Jun. 11, 2012. 3 pages.
Get on Da Mic Review by Jeff Gerstmann. Retrieved from the Internet www.gamespot.cx)rri/ps2/puzzle/getondamic/printable 6110242.html. Retrieved on Jun. 11, 2012. 10 pages.
Get on Da Mic. Retrieved from the Internet: www.ebgames.com/ebx/product/245102.asp. Retrieved on Jun. 11, 2012. 2 pages.
Gitaroo Man. Retrieved from the Internet www.estartand.com/index.asp?page=Piaystation2&cat=PZ&product=676&Q . . . Retrieved on Jun. 14, 2012. 2 pages.
Gitaroo-Man Review by David Smith. Retrieved from the Internet htt£-y^s2.ign.conVara'cles/354/ 354413pjLhtml. Retrieved on Jun. 11, 2012. 4 pages.
Gitaroo-Man Review by Ryan Davis. Retrieved from the Internet: www.gamesrx)t.coiTi/ps2/puzzle/gitaroomart/printable 2847915.html. Retrieved on Jun. 19, 2012. 9 pages.
Gitaroo-Man. Retrieved from the Internet vvvrw.buyritegames.com/productjnformation.asp?re=frgl&number=PS2-GITARO. Retrieved on Feb. 22, 2005. 1 page.
Guitar Freaks (Import) Review by Sam Kennedy. Retrieved from the Internet: www.gamespot.com/pslaction/guitarfreaks/printable_2545966.html. Retrieved on Jun. 11, 2012. 10 pages.
Guitar Freaks Review by Wade Monnig. Retrieved from the Internet: www.gamesarefun.com/gamesdb/review. php? .reviewid=301. Retrieved on Jun. 11, 2012. 3 pages.
Guitar Freaks Sony. Retrieved from the Internet www.gameexpress.com/product_detail.cfm.?UPC=SCPS45422. Retrieved on Feb. 22, 2005. 1 page.
Guitar Freaks with Guitar. Retrieved from the Internet: www.buyritegames.com/product_information.asp?rc=frgl &number=PSJ-GUilWG. Retrieved on Feb. 22, 2005. 1 page.
Guitar Hero (video game)—Wikipedia, the free encyclopedia— (Publisher—RedOctane) Release Date Nov. 2005. 25 pages.
Guitar Hero—Wikipedia, the free encyclopedia—Nov. 2005. http://en.wikipedia.org/w/index.php?title=guitaryhero &oldid=137778068. Retrieved on May 22, 2012. 5 pages.
GuitarFreaks—Wikipedia, the free encyclopedia—(Publisher—Konami, Konami Digital Entertainment) Release Date 1998. Accessed on Mar. 19, 2009. 5 pages.
International Search Report issued for PCT/US2010/054300, dated May 31, 2011 (5 pages).
International Search Report, PCT/US2006/062287, Mailed on May 10, 2007. 2 pages.
Ipodgames.com Tips. Dec. 4, 2004. <http://web.archive.org/web/20041204032612Awww.ipodgames.com/tips.html > 1 page.
Karaoke Revolution Review by Jeff Gerstmann. Retrieved from the Internet www.gamespot.com/ps2/puzzle/ karaokerevolution/printable...6081709.html. Retrieved on Jun. 14, 2012. 10 pages.
Karaoke Revolution. Retrieved from the Internet: www.ebgames.com/ebxlproduct/24806.asp. Retrieved on Feb. 22, 2005. 2 pages.
Karaoke Revolution: The Revolution will be Televised by Ed Lewis. Retrieved from the Internet: http://ps2.ign.com/articles/458/458064p1.html. Retrieved on Jun. 8, 2012. 7 pages.
Lohman, "Rockstar vs. Guitar Hero," (The Rebel Yell). Nov. 13, 2008, accessed on Mar. 19, 2009. 5 pages.
Mad Maestro!—Pre-Played. Retrieved from the Internet: www.ebgames.com/ebx/product/217604.asp. Retrieved on Feb. 22, 2005. 2 pages.
Mad Maestro! by Ryan Davis. Retrieved from the Internet: www.gamespot.com/ps2/puzzle.madmaestro/ printable_2856821.html. Retrieved on Jun. 19, 2012. 9 pages.
Mad Maestro: The First Orchestra-conducting Sim on US Soil—Is It All It Could Have Been? by David Smith. Retrieved from the Internet http://ps2.ign.com/articles/3551355561 pl.html. Retrieved on Jun. 8, 2012. 6 pages.
Mojib Ribbon Playtest by Anoop Gantayat. Retrieved from the Internet: htto://os2.ion.com/articles/442/442204p1.html. Retrieved on Jun. 8, 2012. 4 pages.
Mojib Ribbon—Review. Retrieved from the Internet: www.ntsc-uk.com/review.php?platform=ps2&game=MoiibRibbon. Retrieved on Jun. 14, 2012. 2 pages.
Mojib Ribbon. Retrieved from the Internet: www.lik-sang.comlInfo.php?category=27&productsid=3805&PHPSESSID=b9eQca. Retrieved on Feb. 22, 2005. 1 page.
Mojib Ribbon. Retrieved from the Internet: www.ncsxshop.com/cgi-bin/shop/SCPS.11033.html. Retrieved on Jun. 14, 2012. 2 pages.
NCSX.com; Game Synpopsys of Guitar Freaks and DrumMania Masterpiece Gold, with a date of Mar. 8, 2007, and with an Archive.org Wayback Machine Verified date of May 17, 2007, downloaded from http://web.archiv.org/web/20070517210234/http://www.ncsx.com/2007/030507/guitarfreaks_gold.htm (4 pages).

(56) References Cited

OTHER PUBLICATIONS

Non-Final Office Action as issued by The United States Patent and Trademark Office for U.S. Appl. No. 12/474,899, dated Jan. 19, 2011, 7 pages.
PaRappa the Rapper 2. Retrieved from the Internet:wvAV.amazon.eom/exedobidos/tg/deteil/-/B00005UNWD/ 104-4695527-8827110. Retrieved on Feb. 22, 2005. 2 pages.
PaRappa the Rapper Review by Jer Horwitz. Retrieved from the Internet: www.gamespot.com/pslpuzzlel parappatherapper/printable_2548866.html. Retrieved on Jun. 14, 2012. 9 pages.
Parappa the Rapper. Retrieved from the Internet: wvvw.estarland.com/index.asp?page=Playstation&cat=F&product=6871&q. Retrieved on Jun. 11, 2012. 2 pages.
Parappa the Rapper: PaRapper the Rapper Is finally here, but does it live up to the hype? by Adam Douglas. Retrieved from the Internet http://psx.ign.com/articlesl150/150490p1.html. Retrieved on Jun. 8, 2012. 2 pages.
PopCap Games Site Review via www.download-free-games.com, retrieved on Mar. 3, 2006]. Retrieved from the Internet <URL:http7Avww.download-free-games.com/reviews/popcap_games.htm>. 2 pages.
Ramsey, A. Guitar Freaks and Drum Mania Masterpiece Gold FAQ v. 1.04, Apr. 2, 2007, downloaded from http://www.gamefaqs.com/console/ps2/file/937670/47326. 3 pages.
RedOctane. "Guitar Hero 2 Manual" Activision Publishing, Inc. (2006) (13 pages).
Rez PlayStation^. Retrieved from the internet: http://global.yesasia.com/en/PrdDept.aspx/ pjd-1002847668. Retrieved on Jun. 14, 2012. 1 page.
Rez Review by Jeff Gerstmann. Retrieved from the Internet:www.qamespot.com/ps2/action/rez/printable 2838815.html. Retrieved on Jun. 11, 2012. 9 pages.
Rez. Retrieved from the Internet: www.estarland.com/playstation2.product.5426.html. Retrieved on Jun. 14, 2012. 2 pages.
Rez: You May Not Understand This Review. We May Not Either. But you should certainly play this game by David Smith. Retrieved from the Internet: http://m.ign.com/articles/2002/01/09/rez. Retrieved on Jun. 11, 2012. 3 pages.
SingStar Party (SingStar2) Bundle. Retrieved from the Internet: www.gameswarehouse.com.Au/longpage.asp?gameid=10329. Retrieved on Feb. 22, 2005. 2 pages.
SingStar Party. Retrieved from the Internet: www.argos.co.uk/Webapp/wcs/stores/servlet/ProductDisplay?storeId=10001&langId. Retrieved on Feb. 22, 2005. 1 page.
SingStar Review (PS2) by James Hamer-MortonI. Retrieved from the Internet http://ps2.twomtown.net/en uk/articles/ art.print.php?id=5279. Retrieved on Jun. 11, 2012. 5 pages.
SingStar Review by Luke Van Leuveren. Retrieved from the Internet http://palgn.com.aii/article.php7id-1282. Retrieved on Jun. 11, 2012. 5 pages.
Space Channel 5 Special Edition Review by Brad Shoemaker. Retrieved from the Internet: www.gamescriannel.corn/ps2/puzzle/spacecriannel5pait2/printeble_6085137.h Retrieved on Jun. 11, 2012. 10 pages.
Space Channel 5. Retrieved from the Internet: www.lik-sang.com/info.php?products_is=2050&likref=fro_gle4. Retrieved on Feb. 22, 2005. 1 page.
Space Channel 5: Description. Retrieved from the Internet: www.buyritegames.com/product_information.asp?rc=frgl&number=DC-SPACEC5. Retrieved on Feb. 22, 2005. 1 page.
Space Channel 5: Special Edition by Jason Thompson. Retrieved from the Internet www.popmattere.corn/ mulumerJia/reviews/s/space-channel-5.shtml. Retrieved on Jun. 8, 2012. 2 pages.
Taiko Drum Master Review by Justin Calvert. Retrieved from the Internet: www.gamespot.com/ps2 puzzie/taikodrummaster/printable_6111767.html. Retrieved on Jun. 14, 2012. 10 pages.
Taiko Drum Master w/ Drum. Retrieved from the Internet: www.ebgames.com/ebx/product/244015.asp. Retrieved on Jun. 14, 2012. 2 pages.
Taiko no Tatsujin. Retrieved from the Internet htlpy/games.channel.aol.com/review.adp?gameID-7569. Retrieved on Feb. 22, 2005. 3 pages.
Thalmann, "L'animation par ordinateur" http://web.archive.org/web/20060421045510/http://vrlab.epfl.ch/{thalmann/CG/infogr.4.pdf>, Apr. 21, 2006 (52 pages).
Vib Ribbon (PSX): Homepage, Screenshots by James Anthony. http://www.vib-ribbon.com/vibhtml/english/index.html. Retrieved on Jun. 14, 2012. 1 page.
Vib-Ribbon (Import) Review by Jeff Gerstmann. Retrieved from the Internet: www.gamespot.com/ps /puzzle/vibribbon/printabte 2550100.html. Retrieved on Jun. 14, 2012. 9 pages.
Vib-Ribbon. Retrieved from the Internet: www.ncsxshop.com/cgi-bin/shop/SCPS-45469.html. Retrieved on Feb. 22, 2005. 1 page.
Video MJ the Experience Kinect: announce—Oct. 2010: (http://www.youtube.com/watch?v=xLbiPicu0MM).
Video "Dance Online—Dance lessons gameplay" http://www.youtube.com/watch?v=B4phOjfVNLk Last accessed on Nov. 8, 2012.
Video <http://www.bing.com/videos/search?q=dance+instruction+game&mid=E69356CFA1B6719FF5C8E69356CFA1B6719FF5C8&view=detail&FORM=VIRE5> (uploaded Jul. 27, 2010).
Video Alvin and The Chipmunks Chipwrecked—Majesco Sales: release—Nov. 2011 (http://www.youtube.com/watch?v=xKeW3CUtl4A&feature=related).
Video Dream Dance & Cheer (Released Sep. 13, 2009 for Wii) <http://www.youtube.com/watch?v=oi9vQjT1x5Q>.
Video Just Dance—Ubisoft Paris; <http://www.youtube.com/watch?v=t7f22xQCEpY>; (Nov. 17, 2009).
Video Just Dance 2—Ubisoft; <http://www.youtube.com/watch?v=kpaW9sM_M2Q> (Oct. 12, 2010).
Video Just Dance 2: Oct. 2010 (http://youtu.be/2ChliUgqLtw).
Video Just Dance: Nov. 2009 (http://youtu.be/rgBo-JnwYBw).
Video Kidz Bop Dance Party! The Video Game (Released Sep. 14, 2010 on Wii) <http://www.youtube.com/watch?v=I8VD9EvFdeM>.
Video Let's Cheer—Take 2 Interactive: release—Nov. 2011; announce—Jun. 2011 (http://www.youtube.com/watch?v=uv1IMBIw2Dw&feature=related).
Video Michael Jackson: The Experience—Ubisoft, Ubisoft Paris, Ubisoft Montpelier; <http://www.youtube.com/watch?v=AS3-SuYhSBk> No Date Available.
Video MJ—Paris Week game demo—Oct. 29, 2010 http://www.dailymotion.com/video/xfg4oe_pgw-10-michael-jackson-experience-kinect_videogames?start=13#from=embed <http://www.dailymotion.com/video/xfg4oe_pgw-10-michael-jackson-experience-kinect_videogames?start=13>.
Video MJ the Experience Wii: Nov. 2010 (http://www.youtube.com/watch?v=8ZA59JY8Y_w).
Video MJ:TE Kinect from Aug. 19, 2010 at <http://www.youtube.com/watch?v=6AjGmSnN6qQ>; Michael Jackson The Experience Video Game—Kinect for Xbox 360—Gamescom 2010 HD.
Video MJ:TE on Wii (Nov. 2010); <http://www.youtube.com/watch?v=gmIMNGWxgvo>.
Video N.Y. Comic Con '10—Billie Jean Gameplay Demo: <http://www.gametrailers.com/video/nycc-10-michael-jackson/706056>(Oct. 13, 2010).
Video Tokyo Game Show '10—'Every Step' Trailer: http://www.gametrailers.com/video/tgs-10-michael-jackson/704548 (Sep. 15, 2010).
Video Victorious: Time to Shine—D3 publishers: Dec. 22, 2011 (http://www.youtube.com/watch?v=ud69OK02KGg&feature=fvst).
Video We Cheer 2 (Released Nov. 3, 2009 for Wii) <http://www.youtube.com/watch?v=-4oalxqnbll>.
Video MJ the Experience Kinect: release Apr. 2011, http//www.youtube.com/watch?v=N 7oyxH I P48A.
Video 'Ghosts' Gameplay Trailer: <http://www.gametrailers.com/video/ghosts-gameplay-michaeljackson/ 706825>_(Oct. 27, 2010).
Video <http://www.bing.com/videos/search?q=dance+instruction+game&mid=E69356CFA 1 B6719FF5C8E69356CFA1B6719FF5C8&view=detaii&FORM=VIRE5> (uploaded Jul. 27, 2010).

(56) References Cited

OTHER PUBLICATIONS

Video Britney's Dance Beat (Released May 8, 2002 for PS2); <http://www.youtube.com/watch?v=-KR1dRGNXw>.
Video Dance Dance Revolution: Hottest Party 3 (Released Sep. 27, 2009 for Wii) <http://www.youtube.com/watch?v=zk20hEzGmUY>.
Video Dance on Broadway—Ubisoft, Longtail Studios; <http://www.youtube.comiwatch?v='eYaPdT4z-M>: (Jun. 6, 201Q}.
Video Dance on Broadway: Jun. 2010 (<http://youtu.be/Wi9Y5HHcvtY>).
Video Dance Summit 2001: Bust a Groove (Released Nov. 2, 2000 for PS2); <http://www.youtube.com/watch?v=E8NjTGHYQcM>.
Video Dancing With the Stars—Activision, Zoe Mode; <http://www.youtube.com/watch?v=C7zBVfEJO~:gp (Oct. 2007).
Video Dancing with the Stars: Oct. 2007 (http://www.youtube.com/watch?v=8UChG2v5DI).
Video Dancing with the Stars: We Dance—Activision, Zoe Mode; <http://www.youtube.com/watch?v=31GOb-CT8vs> (Oct. 2008).
Video DDR Hottest Party; <http://www.youtube.com/watch?v=zk20hEzGmUY> (Sep. 2007).
Video Don't Stop' Gameplay Trailer: <http://www.gametrailers.com/video/dont-stop-michaeljackson/ 707336> (Nov. 10, 2010).
Video Dream Dance & Cheer (Released Sep. 13, 2009 for Wii) <http://www.youtube.com/watch?v=oi9vQiT1x5Q>.
Video E3 2010 Live Demo <http://www.gametrailers.com/video/e3-2010-michael-jackson/101449>; (Jun. 14, 2010).
Video Eyetoy Groove for PS2; <http://www.youtube.com/watch?v=c80aaOUfuE> (Apr. 1, 2004).
Video Gamescom '10—Billie Jean Demo <http:/iwww.aarnetraiiHrs.corn/video/gc-1Q..Michael-Jackson/703294>: 1:58-1:13) (Aug. 20, 2010).
Video Gamescom '10—Working Day and Night Demo <http://www.gametrailers.com/video/gc-10-michael-jackson/703295> (Aug. 20, 2010).
Video Grease Dance—505 Games: release—Oct. 2011 http://www.youtube.com/watch?v=PaGBHSB2urg, last access Nov. 8, 2012.
Video Hannah Montana: Spotlight World Tour (Released Nov. 6, 2007 for Wii); <http://www.voutube.com/watch?v=WtyuU2NaL3Q>.
Virginia Tech Multimedia Music Dictionary: "P: Phrase" Virginia Tech University, http://www.music.vt.edu/musicdictionary/textp/Phrase.html. Retrieved May 25, 2011 (7 pages).
Microsoft PowerPoint Handbook, p. 616 (1992).
Kuwayama, Y. Trademarks & Symbols, vol. 2: Symbolical Designs, Van Nostrand Reinhold Company, (Nov. 4, 1980). 4 pages.
Boombox Icons, http://findicons.com/search/boombox, viewed on Jul. 31, 2012 copyright 2010. 1 page.
[Video] Microsoft Office Online Clip Art, http://office.microsoft.com/en-us/clipart/results.aspx?Scope=MC,MM,MP,MS&PoleAssetID=MCJ04316180000&Querty=Icons&CTT=6&Origin=EC01017435m (Feb. 21, 2007) 1 page.
U.S. Appl. No. 12/913,493, filed Oct. 27, 2010 (69 pages).
U.S. Appl. No. 29/393,964, filed Jun. 10, 2011 (2 pages).
U.S. Appl. No. 29/393,967, filed Jun. 10, 2011 (2 pages).
U.S. Appl. No. 29/393,968, filed Jun. 10, 2011 (2 pages).
U.S. Appl. No. 29/393,970, filed Jun. 10, 2011 (2 pages).
U.S. Appl. No. 29/393,973, filed Jun. 10, 2011 (2 pages).
U.S. Appl. No. 29/393,975, filed Jun. 10, 2011 (2 pages).
Taiko Drum Master Game Manual, Namco Ltd. for PlayStation 2 (Oct. 25, 2004, 18 pages).
Konami Corporation, The computer game "Dance Dance Revolution Max", released in the US by Konami Corporation on Oct. 29, 2002, as evidenced by the game manual (2 pgs.).

\* cited by examiner

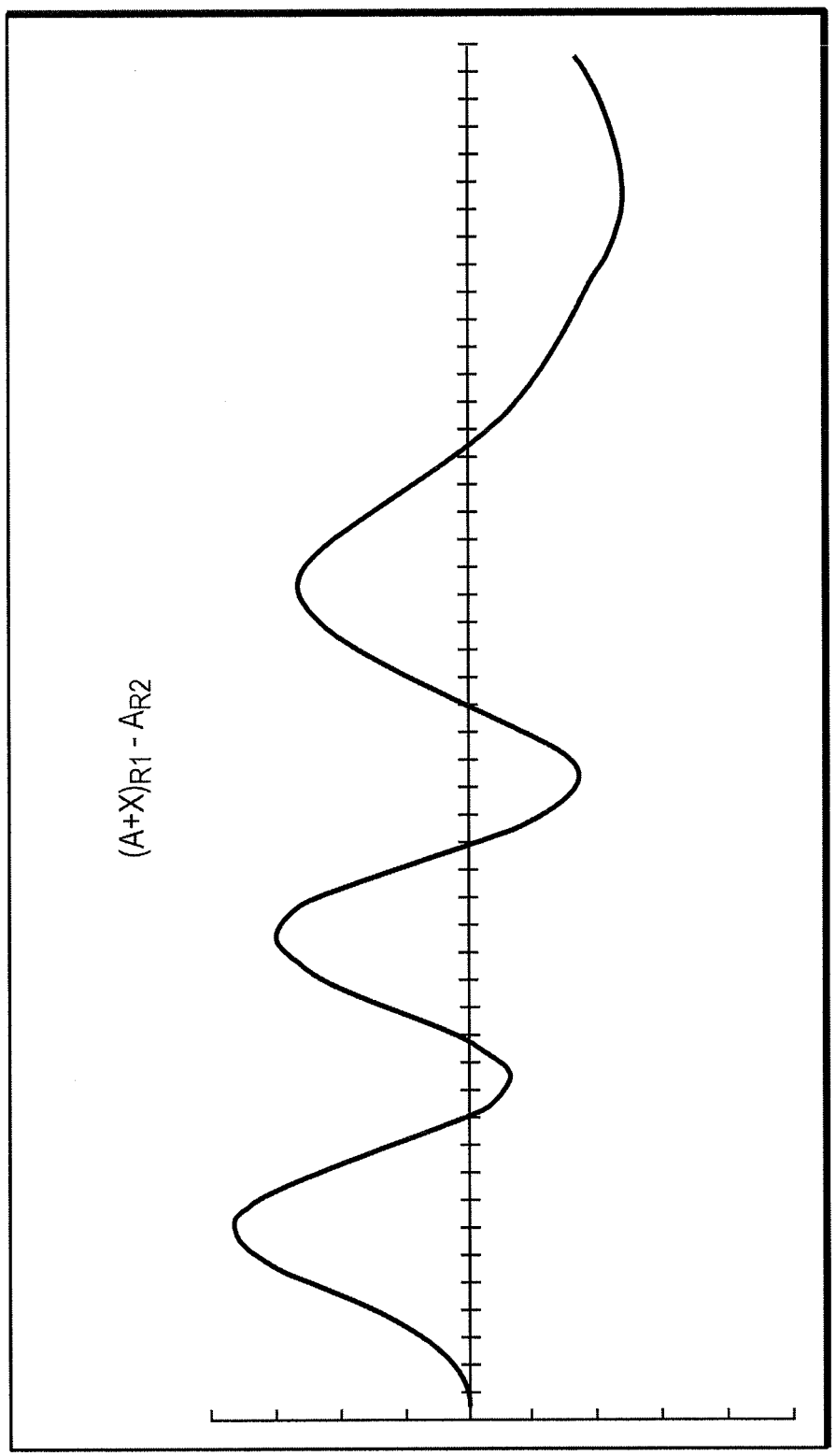

PREVENTING SUBTRACTIVE TRACK SEPARATION

FIELD OF THE INVENTION

The present invention relates generally to preventing subtractive track separation and, more specifically, to manipulating an audio track to prevent unwanted re-creation of the audio track.

BACKGROUND

Copyright infringement is a serious issue in the recording industry and among musicians. What some consider "sampling," others consider stealing. Yet sampling is a lucrative path to creating music. The infringer does not need to re-perform a sampled piece and does not need to pay others to recreate it. Naturally, musicians and record labels wish to protect their music from being sampled and re-used wholesale by infringers.

In "music minus one" recordings, a mix of a song is provided minus one musical part, e.g., a guitar track or a vocal track. These music-minus-one recordings are useful for training because the user can practice the missing audio and have a full accompaniment that can be rewound or replayed as often as necessary.

A danger of music-minus-one recordings is that if the music-minus-one recording is "subtracted" from the original recording (with all parts present), the "stem" (track) that represents the missing audio can be recreated. This will give the infringer a perfect copy of the missing track. This is especially an issue for recent rhythm-action games because they can, in theory, be music-minus-one recordings for each part—guitar, bass, vocals, and drums—as well as full recordings (assuming all parts are played perfectly).

A typical rhythm-action game mixes together individual stems during gameplay. To make the experience immersive, the game can mute, attenuate, or otherwise alter a stem when the corresponding player's performance is imperfect. The game can also mix in additional sounds to indicate that a mistake was made. When a player provides the expected input at the expected time, however, their corresponding stem is unmuted, unattenuated, and otherwise unaltered in the final mix.

Selective muting or attenuation allows a potential infringer to derive a particular audio track by playing the rhythm-action game first perfectly (so the whole ensemble is heard) and then again, but missing every note. If both performances are recorded, the all-misses recording can be subtracted from the all-perfect recording and the stem for that part can be obtained. The following example illustrates this type of attack.

An example song is comprised of a stem audio track "X" and an additional audio track "A." In some embodiments, A is the playback of all instrument tracks except stem audio track X, while in other embodiments, A is the composite of several separate stem tracks, each representing an instrument or combination of instruments. During a first play-through of the song, a player uses a video game controller to provide input that matches musical cues (known as gems) corresponding to stem audio track X, such that the video game platform outputs audio that is an exact reproduction of the full ensemble in the original song, i.e., A+X. During a second play-through of the song, the player provides no input to match the musical cues corresponding to stem audio track X, such that the video game platform outputs an audio track that is the full audio of the original song, but without the stem represented by stem audio track X. Subtracting the audio output of the second play-through from the audio of the first play-through results in the stem audio track X. In other words, (A+X)−A=X. Using this technique, valuable stem tracks can be stolen.

SUMMARY OF THE INVENTION

The present invention provides a way to prevent a player from obtaining an instrument track using a rhythm game.

In one aspect, the invention features, a method for preventing filtering of original audio tracks from a song executed on a computerized game platform. The method involves providing a first audio track representing a part of a musical composition, providing a second audio track representing at least one part of a musical composition, the at least one part being different than the part represented by the first track, and mixing the first audio track and the second audio track to provide a mixed audio track. The method also involves generating an audio modification data comprising a series of substantially random audio modifiers and modifying, before playback, the mixed audio track based on the audio modification data to provide a modified mixed audio track, such that, subtracting the second audio track from the modified mixed audio track produces a third audio track with an audibly detectable deviation from the first audio track.

In some embodiments, the second audio track is randomized during a subsequent playback based on second audio modification data. In some embodiments, generating the audio modification data further comprises determining the substantially random audio modifiers by setting the substantially random audio modifiers to a first value for a first random time interval and setting the substantially random audio modifiers to a second value for a second random time interval.

In some embodiments, the first random time interval and the second random time interval are between 1 and 2 seconds. In some embodiments, modifying the mixed audio track by the substantially random audio modifiers changes pitch of the mixed audio track and the first value produces a positive 1.666 percent change in pitch and the second value produces a negative 1.666 percent change in pitch.

In some embodiments, modifying the mixed audio track comprises speeding up the mixed audio track or slowing down the mixed audio track based on the substantially random audio modifiers. In some embodiments, the method involves playing the output track. In some embodiments, the substantially random audio modifiers alter the mixed audio track such that the modification changes pitch of the mixed audio track. In some embodiments, the first audio track and the second audio track are guitar tracks, bass tracks, vocal tracks, drum tracks, other musical instrument tracks or any combination thereof.

In another aspect, the invention features a method executed on a game platform. The method involves providing a first audio track representing a part of a musical composition, providing a second audio track representing at least one part of a musical composition, the at least one part being different than the part represented by the first track, and generating an audio modification track comprising a series of substantially random audio modifiers. The method also involves mixing the first audio track and the second audio track to provide a mixed audio track and modifying, before playback, the mixed audio track based on the audio modification track.

In another aspect, the invention features a method executed on a game platform. The method involves providing a first audio track representing a part of a musical composition, providing a second audio track representing at least one part of a musical composition, the at least one part being different than the part represented by the first track, and mixing the first audio track and the second audio track to provide a mixed audio track. The method also involves generating an audio modification track comprising a series of substantially random audio modifiers and modifying, before playback, the mixed audio track based on the audio modification track.

In another aspect, the invention features a method executed on a game platform. The method involves providing a first audio track representing a part of a musical composition, providing a second audio track representing at least one part of a musical composition, the at least one part being different than the part represented by the first track, and generating an audio modification track comprising a first series of substantially random audio modifiers. The invention also involves modifying, before playback, the first audio track based on the audio modification track, modifying, before playback, the second audio track based on the audio modification track, and mixing the modified first audio track and the modified second audio track to provide a mixed audio track for playback.

In another aspect, the invention features a method for preventing filtering of original audio tracks from a song executed on a computerized game platform. The method involves providing a first audio track representing a part of a musical composition, providing a second audio track representing at least one part of a musical composition, the at least one part being different than the part represented by the first track, and generating an audio modification track comprising a series of substantially random audio modifiers. The method also involves mixing the first audio track and the second audio track to provide a mixed audio track and modifying, before playback, the mixed audio track based on the audio modification track to provide a modified mixed audio track, such that, subtracting the second audio track from the modified mixed audio track produces a third audio track with an audibly detectable deviation from the first audio track.

In another aspect, the invention features a computer program product, tangibly embodied in a computer-readable medium, for preventing filtering of original audio tracks from a song. The computer program product includes an executable instruction operable to cause a game platform to provide two or more original audio tracks, mix the two or more original audio tracks to provide a mixed audio track, and generate an audio modification track comprising a series of substantially random audio modifiers. The executable instructions are also operable to cause the game platform to modify, before playback, the mixed audio track based on the audio modification track to provide a modified mixed audio track, such that, subtracting the second audio track from the modified mixed audio track produces a third audio track with an audibly detectable deviation from the first audio track.

In another aspect, the invention features a computer program product, tangibly embodied in a computer-readable medium, for preventing filtering of original audio tracks from a song. The computer program product including executable instruction operable to cause a game platform provide a first audio track representing a part of a musical composition, provide a second audio track representing at least one part of a musical composition, the at least one part being different than the part represented by the first track, and generate an audio modification track comprising a first series of substantially random audio modifiers. The executable instruction is also operable to cause a game platform to modify, before playback, the first audio track based on the audio modification track, modify, before playback, the second audio track based on the audio modification track, and mix the modified first audio track and the modified second audio track to provide a mixed audio track for playback.

In another aspect, the invention features a computer program product, tangibly embodied in a computer-readable medium, for preventing filtering of original audio tracks from a song. The computer program product including executable instruction operable to cause a game platform to provide a first audio track representing a part of a musical composition, provide a second audio track representing at least one part of a musical composition, the at least one part being different than the part represented by the first track, and generate an audio modification track comprising a series of substantially random audio modifiers. The executable instruction is also operable to cause a game platform to mix the first audio track and the second audio track to provide a mixed audio track and modify, before playback, the mixed audio track based on the audio modification track to provide a modified mixed audio track, such that, subtracting the second audio track from the modified mixed audio track produces a third audio track with an audibly detectable deviation from the first audio track.

Advantages of the invention include that the audio that is output in the case of a flawless performance is as close as possible to the original recording, that the audio that is output in the case of an imperfect performance is as close as possible to the original recording without the corresponding instrument, and that the stem tracks are prevented from being stolen.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 8A illustrates a result of an attempt to extract track X by subtracting track A randomized by the random data stream R2 from the combination of track A mixed with track X randomized by random data stream R1;

DETAILED DESCRIPTION

Figure 1:
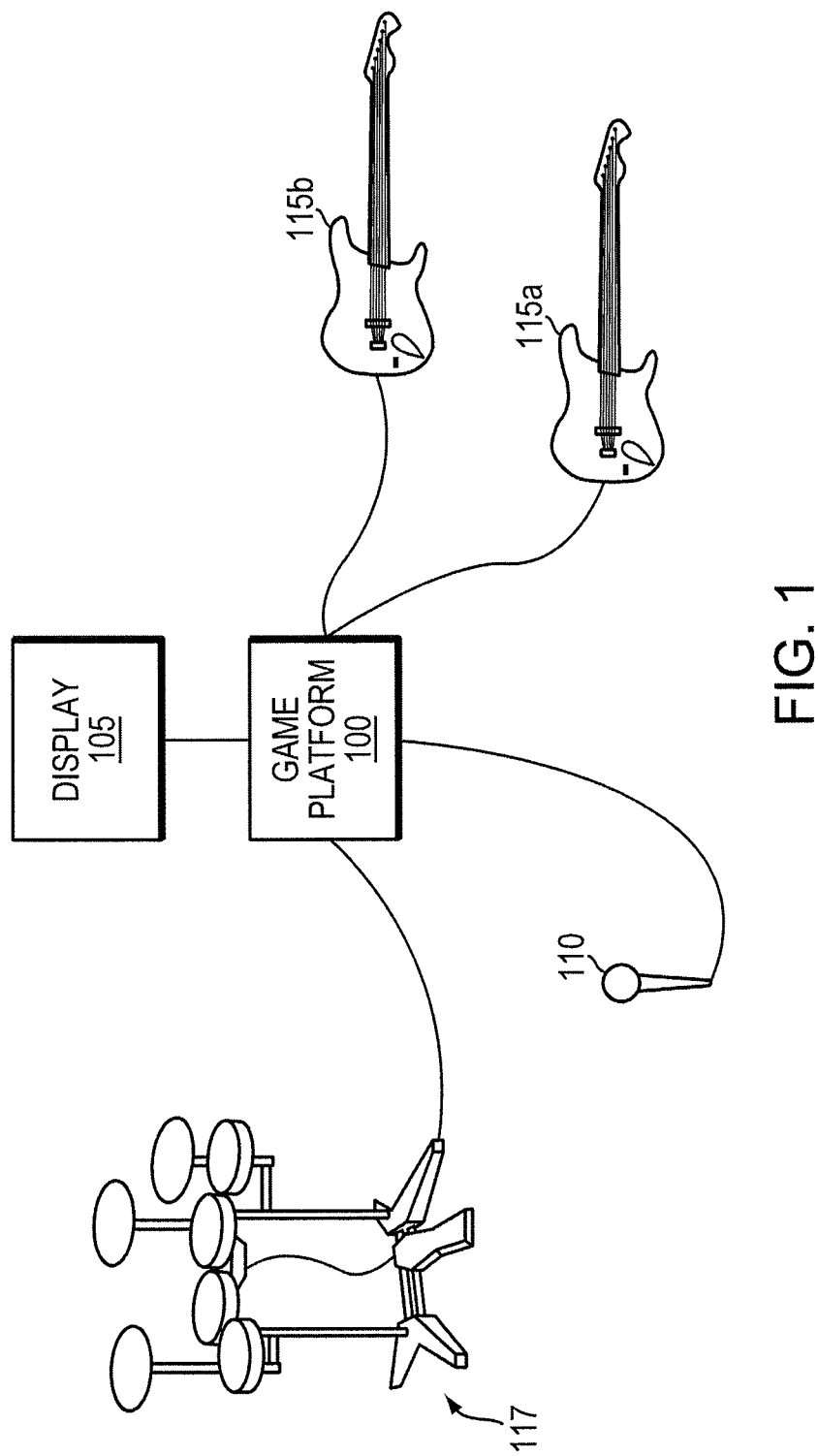
FIG. 1 is a diagram of a system for playing a rhythm-action game.

FIG. 1 is a diagram depicting a game platform 100 for running game software and various components in signal communication with the game platform. Each player may use a game platform 100 in order to participate in the game. In one embodiment, the game platform 100 is a dedicated game console, such as: PLAYSTATION® 2, PLAYSTATION® 3, or PSP® manufactured by Sony Corporation; WII™, NINTENDO DS®, NINTENDO DSi™, or NINTENDO DS LITE™ manufactured by Nintendo Corp.; or XBOX® or XBOX 360® manufactured by Microsoft Corp. In other embodiments, the game platform 100 comprises a personal computer, personal digital assistant, or cellular telephone. Throughout the specification and claims, where reference is made to "the game platform 100" performing a function, "game platform 100" may, for some implementations, be read as "game platform 100 with game software executing on it." References to the game platform 100 and omission of reference to the game software does not imply absence of the game software. Game software alone may also embody the invention, e.g., a computer program product, tangibly embodied in a computer-readable storage medium, while in some embodiments the invention is implemented purely in hardware such as a computer processor configured to perform specific functions. In other embodiments the invention is embodied by a combination of hardware and software.

The game platform 100 is typically in electrical and/or signal communication with a display 105, e.g., via an HDMI cable. This may be a television, an LCD monitor, projector, or the like. The game platform is also typically in electrical or signal communication with one or more controllers or input devices. In FIG. 1, the game platform 100 is in signal communication with a one or more microphones 110, a first simulated guitar controller 115a, a second simulated guitar controller 115b (guitar controllers, collectively, 115), and one or more drum peripherals 117. Other inputs can be other simulated instruments such as keyboards (not shown), standard controllers for the respective game platforms, and/or keyboards and/or mice (also not shown). Microphones, controllers, etc. may be connected via a physical wire, e.g., via a USB connection, or may be connected wirelessly, e.g., via Bluetooth, FM, a proprietary wireless protocol used by the Microsoft Xbox 360 game console, or other wireless signaling protocols.

Though reference is made to the game platform 100 generally, the game platform, in some embodiments, contains hardware and/or software that perform general or specific tasks, such as a central processing unit, an instrument analysis module, a singing analysis module, a sound processing module that provides sound output, e.g., to a speaker, a storage device, Random Access Memory, Read Only Memory, peripheral interfaces, networking interface, media interfaces (e.g., a CD-ROM, DVD, or Blu-Ray drive or SD, Compact Flash, or other memory format interfaces), graphic processors and others. Each module may also contain sub-modules. For example the singing analysis module may contain a data extractor module, a digital signal processor module, a comparison module, and a performance evaluation module (not shown). Alternatively, in software implementations of the modules, modules or combinations of modules may reside within the RAM or ROM (and/or be loaded into these from media via the media interface or from storage) for execution by the central processing unit.

In some embodiments, execution of game software limits the game platform 100 to a particular purpose, e.g., playing the particular game. In these scenarios, the game platform 100 combined with the software, in effect, becomes a particular machine while the software is executing. In some embodiments, though other tasks may be performed while the software is running, execution of the software still limits the game platform 100 and may negatively impact performance of the other tasks. While the game software is executing, the game platform directs output related to the execution of the game software to the display 105, thereby controlling the operation of the display. The game platform 100 also can receive inputs provided by one or more players, perform operations and calculations on those inputs, and direct the display to depict a representation of the inputs received and other data such as results from the operations and calculations, thereby transforming the input received from the players into a visual representation of the input and/or the visual representation of an effect caused by the player.

In some embodiments, the processor reads song data from a MIDI-like file. MIDI tracks in the file dictate information for specific instruments or game objects, such as cameras or scene information. The MIDI "notes" in the tracks are indicators for song data, gem placement information, avatar action cues, camera cuts, cues for events on stage, and other game events. Although the MIDI file uses MIDI note numbers, these MIDI notes do not typically correspond to actual note or pitch information.

The audio data for a song in rhythm-action games usually comprises several separate audio tracks known as "stems." The stems are derived from the master audio tracks of an original song recording. These are often the same master audio tracks that are mixed together to produce a final audio stereo mix heard in the published version of a song (on a CD, for example). Typically, there is at least one stem for each playable part of the song.

Figure 2:
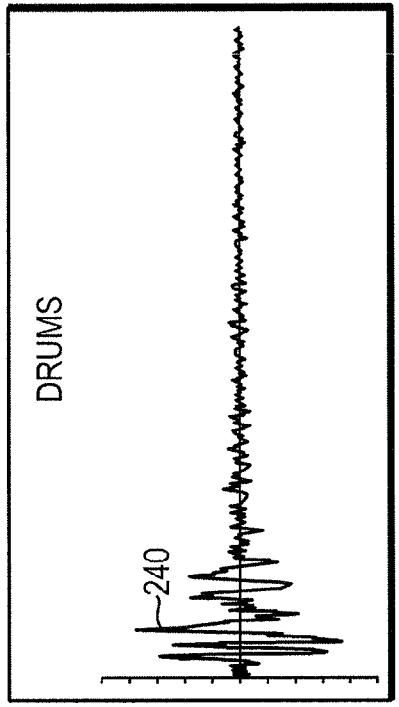
FIG. 2 is multiple graphs of stems for various song parts.
Figure 2:
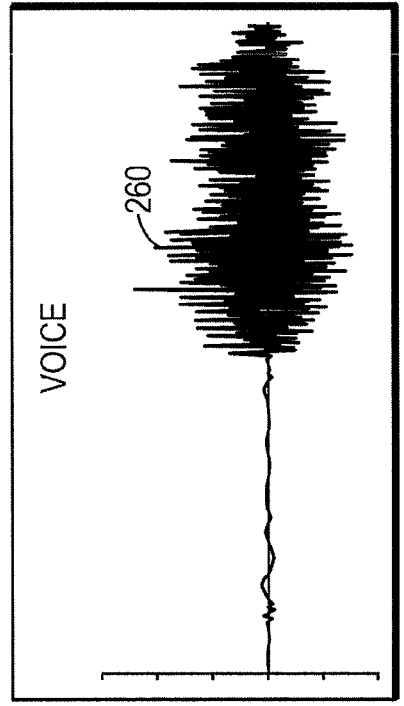
Figure 2:
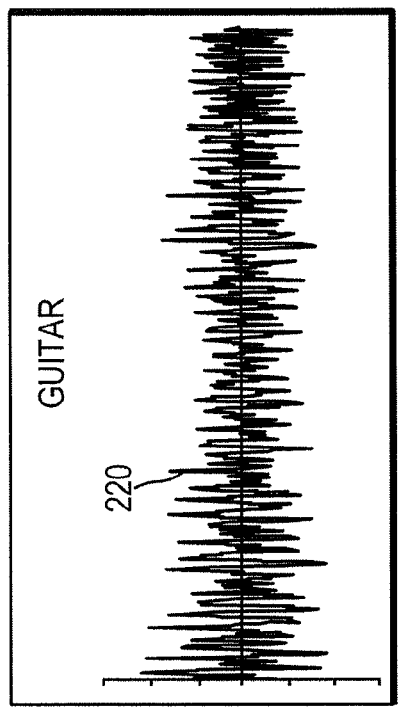
Figure 2:
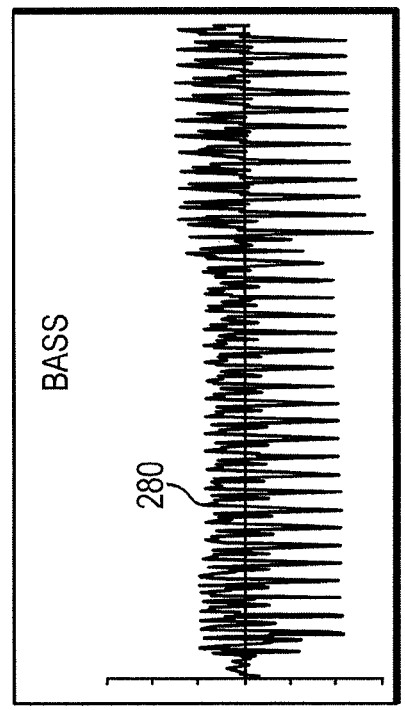

FIG. 2 shows graphs 200 of stems for various parts of a song, e.g., a stem 220 for a guitar part of the song, a stem 240 for a drum part of the song, a stem 260 for a vocal part of the song, and a stem 280 for a bass part of the song. Additional musical parts may be used as well, depending on the song, e.g., some songs also have keyboard parts. During gameplay, stems corresponding to each part that players have selected to play (selectively altered depending on each players' respective performance), stems corresponding to the parts that are not being played by the players, and background music and sounds are dynamically mixed together. The dynamic mixing produces the final audio—a combination of background music, stems corresponding to non-player-selected parts, and the stems corresponding to parts being played by players— heard during gameplay. Dynamic mixing allows the game to affect the sound of the whole song based on the users' input. For example, a part may be attenuated or muted when a player is not playing his or her part correctly. Additionally or alternatively, effects such as pitch-bending can be added to a particular stem based on input from a player. Additional sounds not present in the original recording may also be added, e.g., a "miss" sound when the player does not play his or her part correctly. These all make the simulated musical experience more authentic and immersive.

Figure 3:
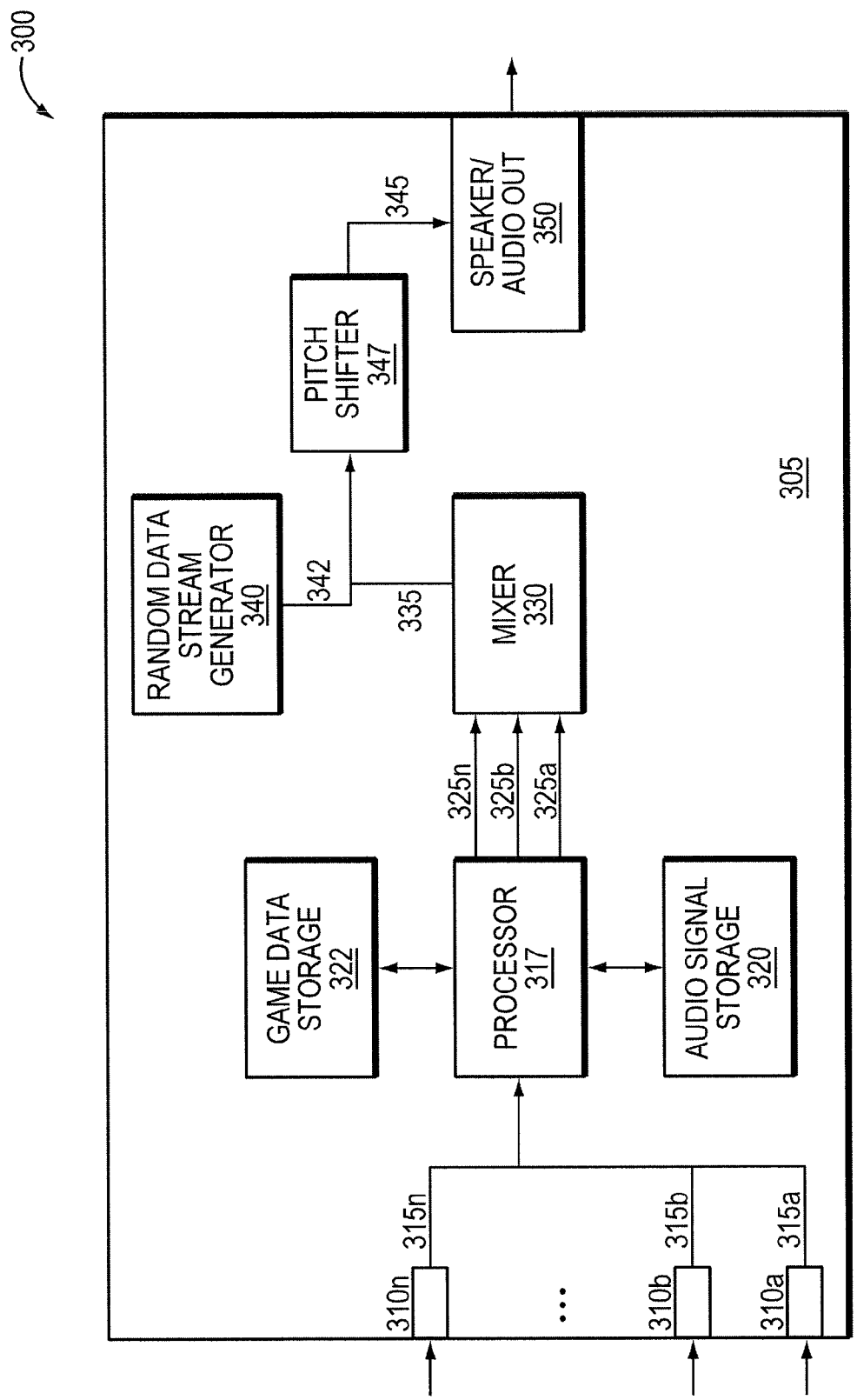
FIG. 3 is a block diagram of an exemplary video game platform.

FIG. 3 is a block diagram 300 of some internal components of an exemplary video game platform 305. During gameplay, one or more input signals are received by the video game platform 305 via one or more ports 310a, 310b, . . . , 310n, generally 310. As described above, the input signals correspond to buttons pushed on video game controllers or input actions provided by one or more players during gameplay. Not all ports necessarily receive input at the same time— input varies with the number of instrument/game controllers present and the number of players playing. The ports 310 are configured to receive input from any of a guitar video game controller, a microphone, a bass video game controller, a drum video game controller, a musical instrument video game controller, or any combination thereof.

The input signals 315a, 315b, . . . , 315n, generally 315, are input to a processor 317. During gameplay, the processor 317 loads and controls the playback of stems, background, and sound effects retrieved from an audio signal storage device 320. The storage device 320 can be an optical disc, a hard drive, a flash drive, or it can be random access memory or read only memory of the game platform 305. During gameplay, the processor 317 determines if the players' input signals 315 coincide with the expected inputs retrieved from game data storage 322 at the correct times (game data storage 322 may be a separate device from the audio signal storage 320, or, in some embodiments, on the same medium as the audio signal storage 320). The processor 317 then controls which audio signals 325a, 325b, . . . , 325n are input to the mixer 330. In some embodiments, the mixer 330 is implemented as part of the processor 317. For example, if during gameplay a player performs his or her part correctly, that is, the player presses the correct buttons and correctly strums on a video game controller at the correct time throughout the song, then the audio track that is fed to the mixer for that instrument—over the course of the song—is the entire stem for that instrument. However, if during gameplay a player does not play his or her part correctly, e.g., doesn't strum at the indicated time, or strums while pressing a button other than the indicated button, or strums at the wrong time with the proper button pressed, the processor 317 mutes or affects the audio track for that instrument as that audio stream is fed to the mixer. This results in a fragmented performance of that particular part, and correspondingly the song as a whole.

Once the mixer 330 receives the audio from the processor 317, the mixer 330 mixes the output audio tracks to produce a mixed audio track. In one embodiment, the mixer produces a weighted sum of input audio tracks. In various embodiments, the audio is input to an equalizer, a compressor, a limiter and/or any other audio pipeline components.

The mixed audio track is input 335 to a pitch shifter 347. A random data stream generator 340 generates a random data stream 342. The random data stream 342 is input to the pitch shifter 347. The pitch shifter 347 resamples the mixed audio track 335 according to the resampling ratio provided by the random data stream 342 to produce a randomized mixed audio track 345. In some embodiments, the random data stream 342 is a series of percentages that indicate the percentage a pitch of the mixed audio track input 335 is shifted relative to its original sample rate. In some embodiments, the random data stream 342 is a series of percentages that indicate the percentage a pitch of the mixed audio track input 335 is shifted relative to its current resampling ratio. Typically the effect of applying the randomized data stream to the mixed track results in a difference that is undetectable to the human ear.

The randomized mixed audio track 345 is then output to a speaker or audio out port 350 of the video game platform 305 for playback to the player. A benefit of the randomized mixed audio track is evident during subsequent play-throughs of the game. With each play-through of the song, the final audio is slightly different. When a subtraction attempt is made, the randomized audio that is different between the final outputs creates artifacts that make the resulting stems unusable. In some embodiments, the artifacts sound like irregular flanging effects. The process is explained in more detail below.

Figure 4:
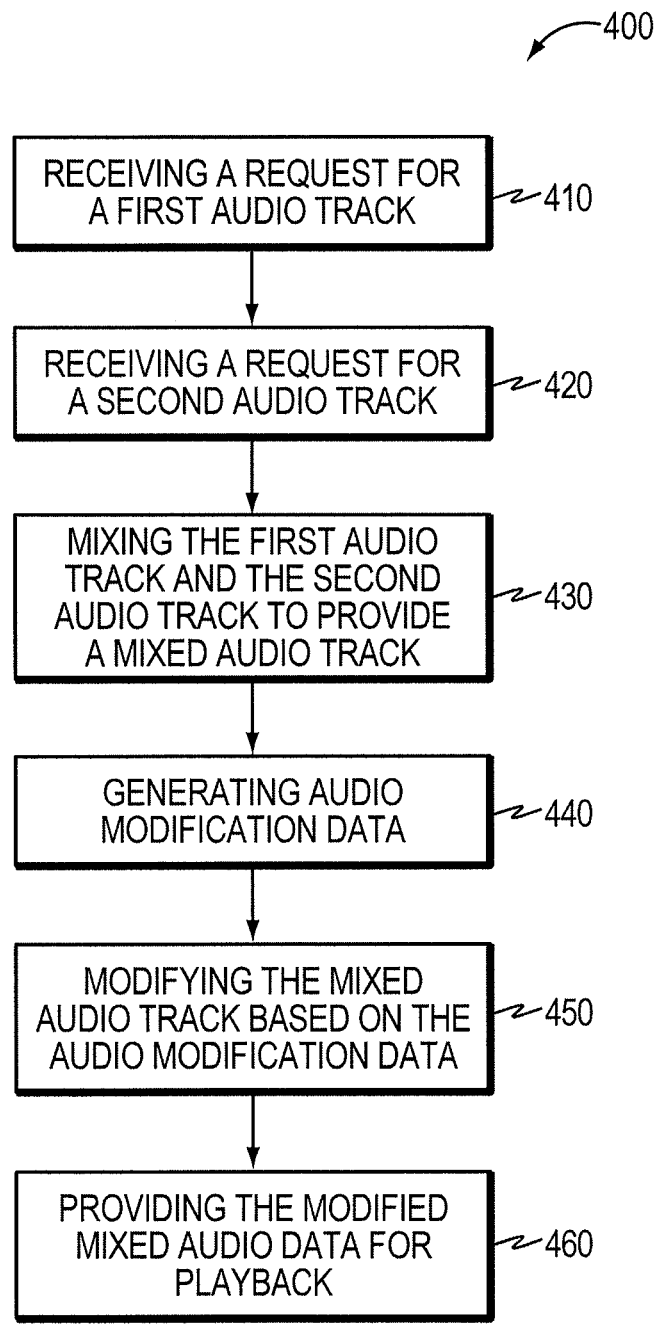
FIG. 4 is a flow chart of a method for preventing filtering of original audio tracks from a song executed on a computerized game platform.
Figure 5A:
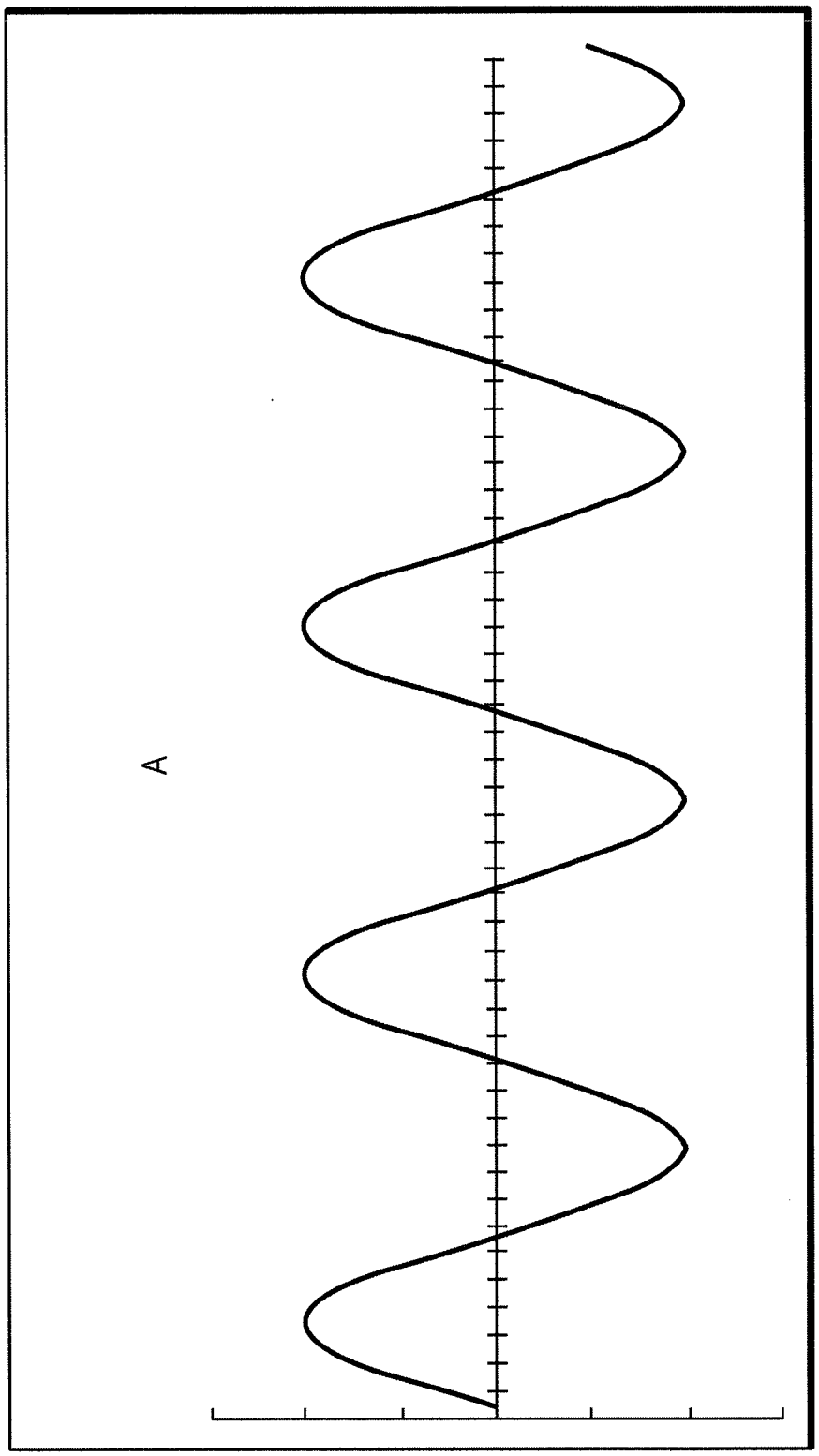
FIG. 5A illustrates an audio track A.
Figure 5B:
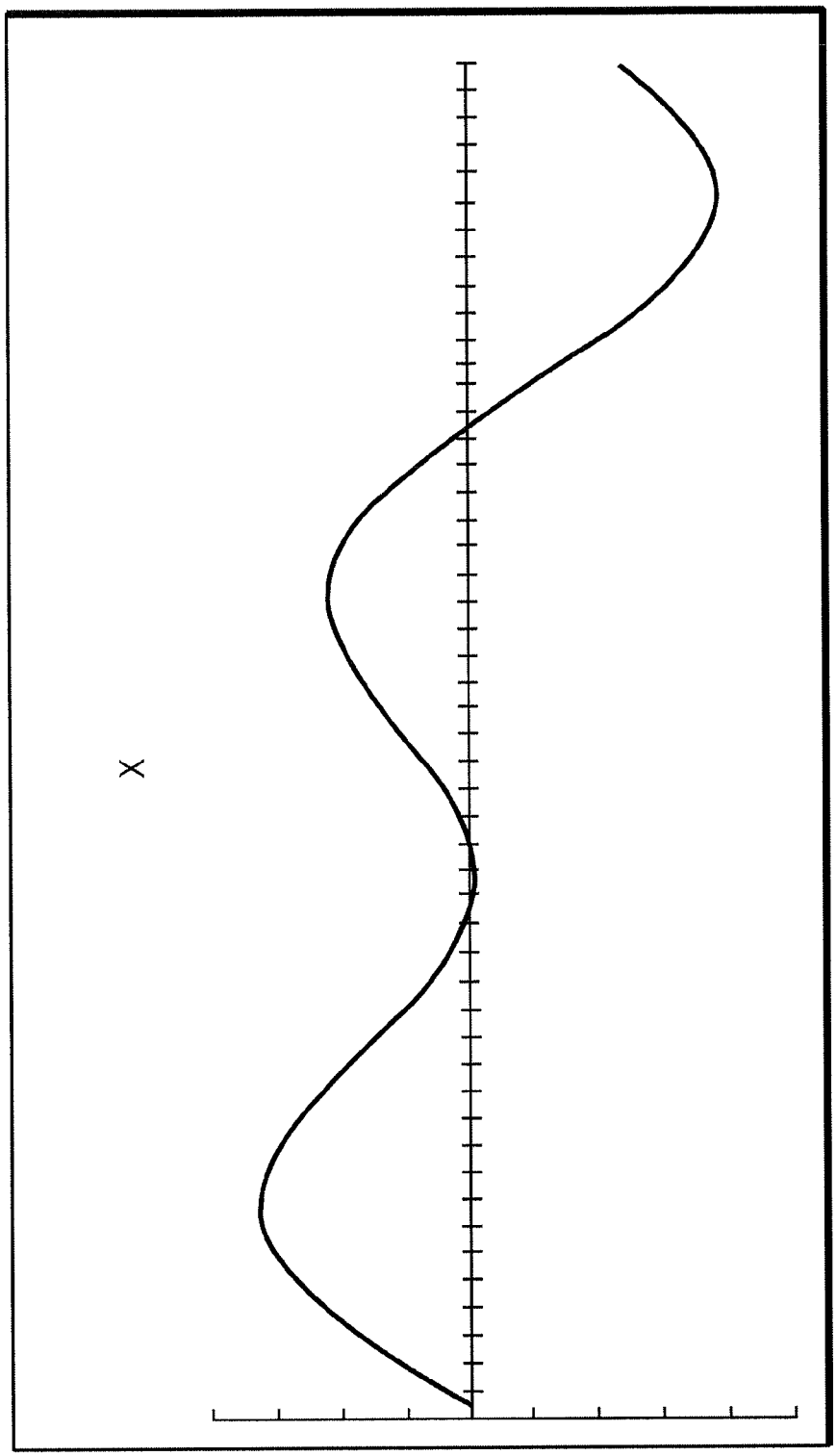
FIG. 5B illustrates an audio track X.

FIG. 4 is a flow chart 400 describing one technique for preventing filtering of original audio tracks from a song executed on a computerized game platform. The method begins by receiving (Step 410) a request for a first audio track. The first audio track (shown in FIG. 5A) is an audio track "A" belonging to a song that has at least two audio tracks, and, in some embodiments, the audio track has both a left audio track component and a right audio track component, i.e., the audio track is a stereo pair. The method also includes receiving (Step 420) a request for a second audio track. The second audio track (shown in FIG. 5B) is an audio track belonging to the song, separate from track A. The second audio track will be referred to as track "X".

Figure 5C:
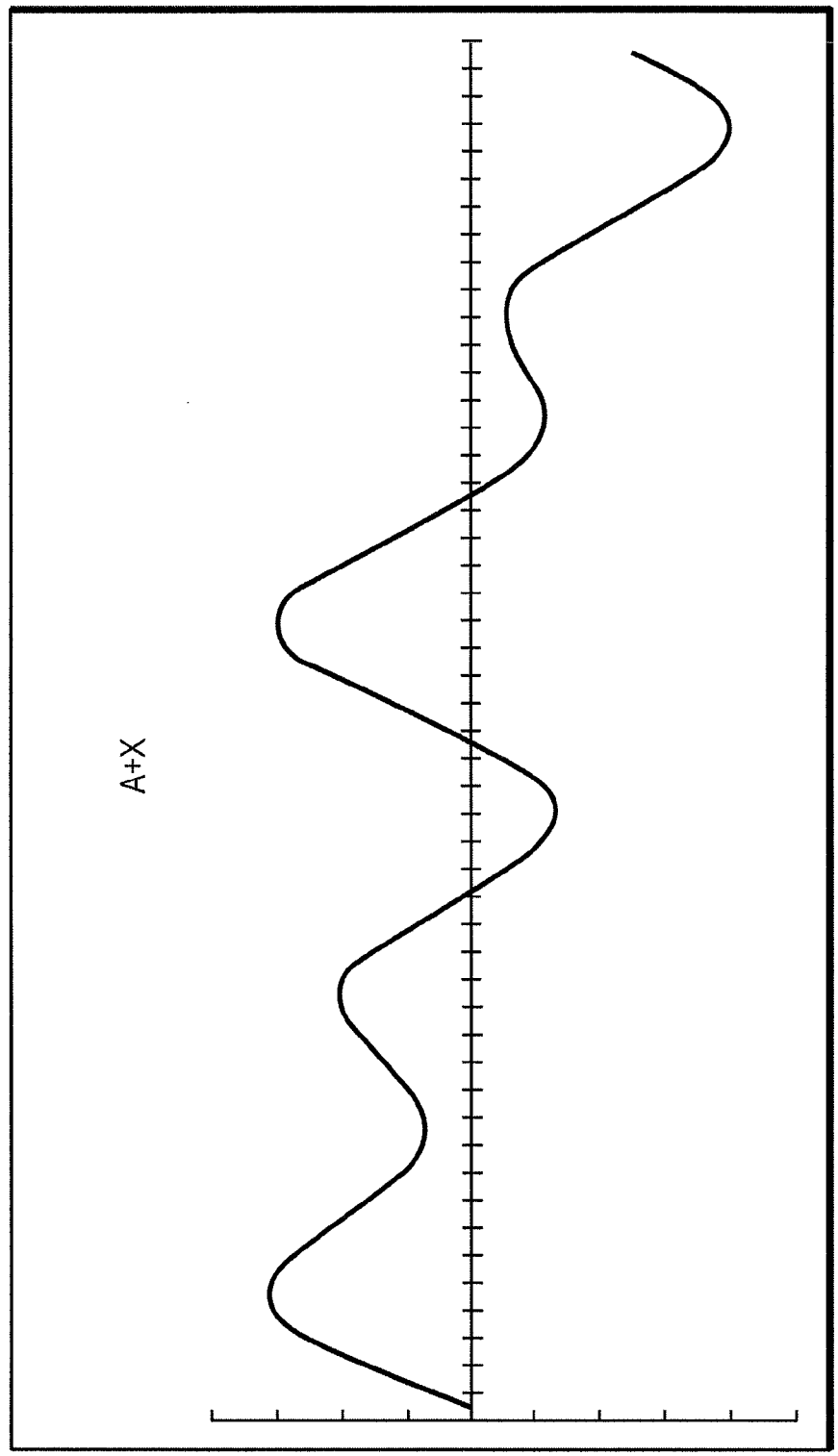
FIG. 5C illustrates a mixed audio track A+X.

The first audio track and the second audio track are then mixed (Step 430), e.g., by a mixer 330, to provide a mixed audio track, shown in FIG. 5C as A+X. As discussed above, during perfect gameplay, the mixed audio track is a reproduction of the full song. In some embodiments, the song is composed of multiple audio tracks, either corresponding to parts that are playable by other players, or corresponding to parts that are playable by the same player on multiple instruments simultaneously, or corresponding to parts that are unplayable background music, and thus multiple audio tracks beyond A and X are mixed during Step 430.

Figure 6A:
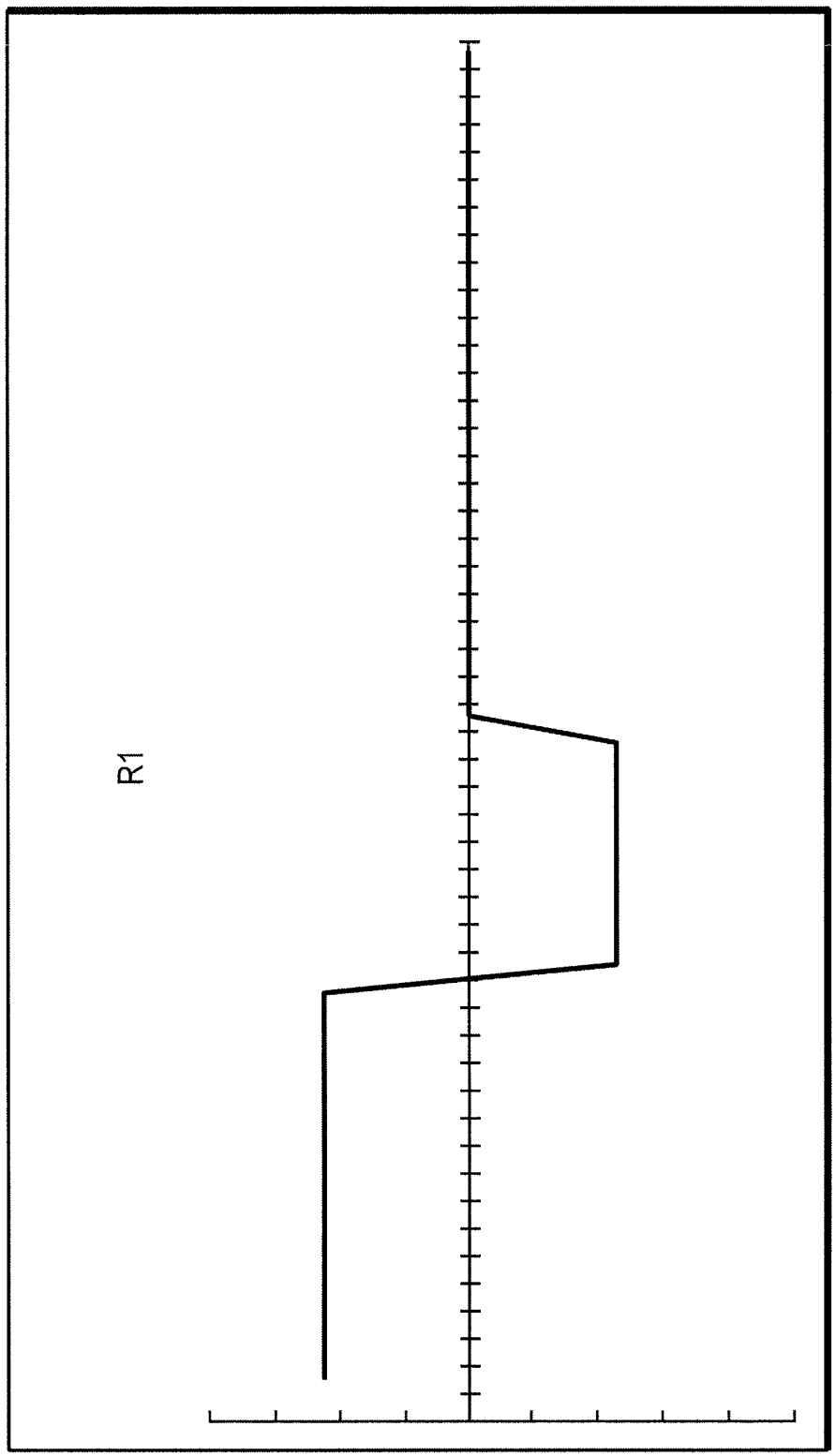
FIG. 6A illustrates a random data stream R1, which indicates a series of very small pitch shift percentages.

Then, audio modification data is generated (Step 440), typically by a random data stream generator 340. FIG. 6A shows an exemplary audio modification data "R1." In some embodiments, the audio modification data is generated by generating a new random number for a specified duration of the audio track. In some embodiments, the random numbers generated are based on a seed value, s, such that the sequence of numbers generated based on the same seed is always the same, but the sequence of numbers generated based on a different seed is always different.

Figure 6B:
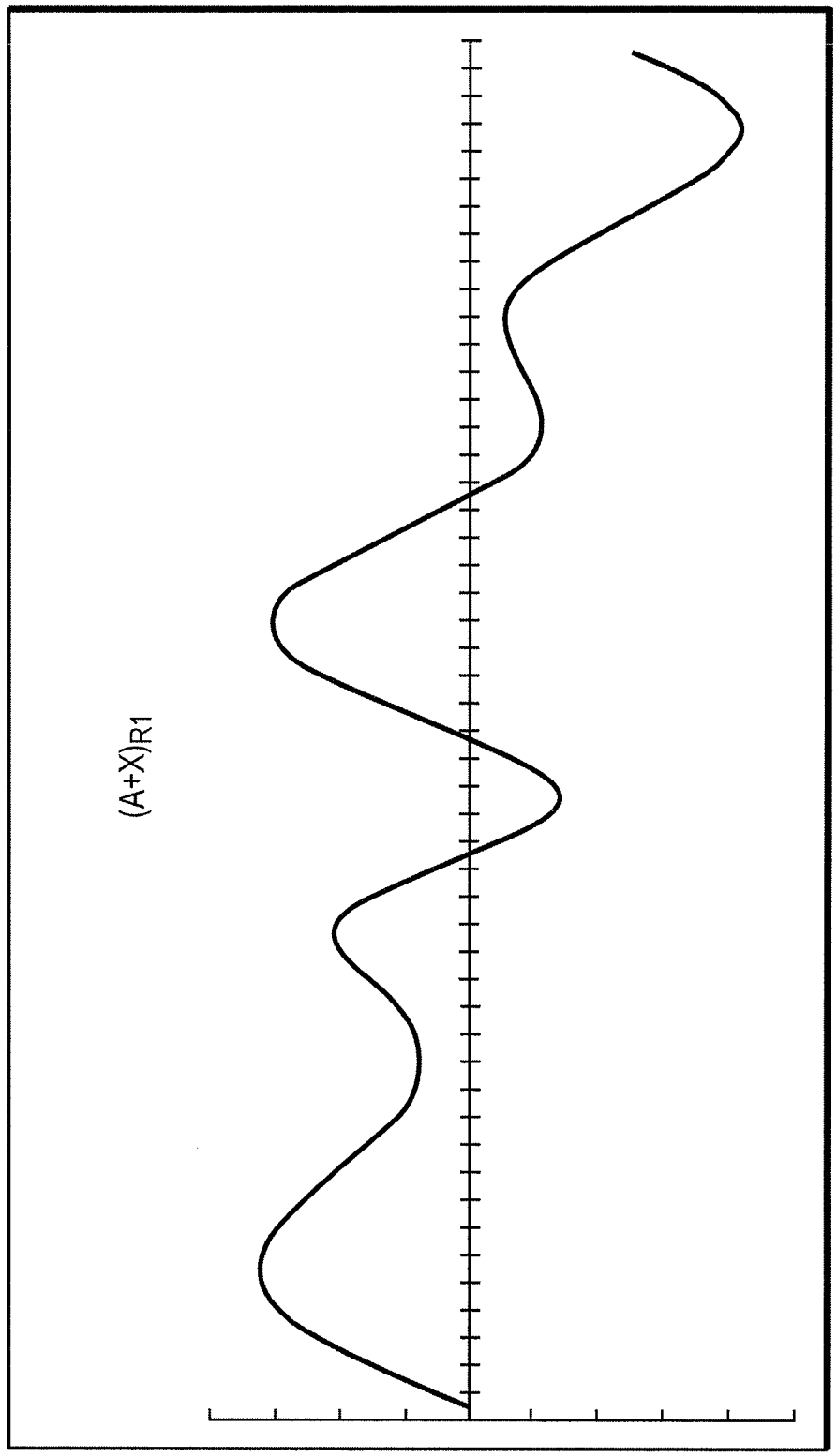
FIG. 6B illustrates track A mixed with track X and randomized by random data stream R1.
Figure 7A:
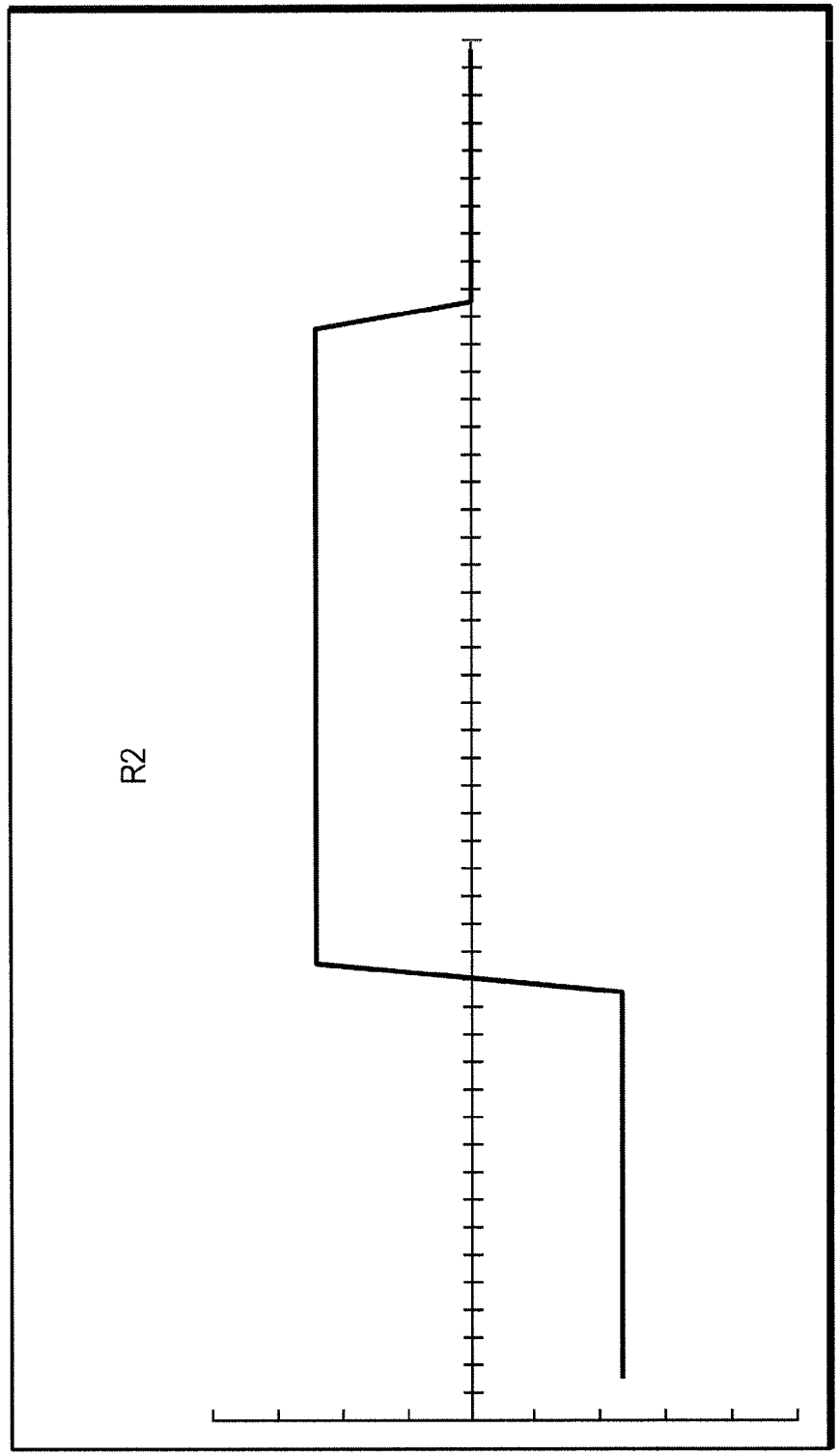
FIG. 7A illustrates a random data stream R2, which indicates a series of very small pitch shift percentages different from R1.
Figure 7B:
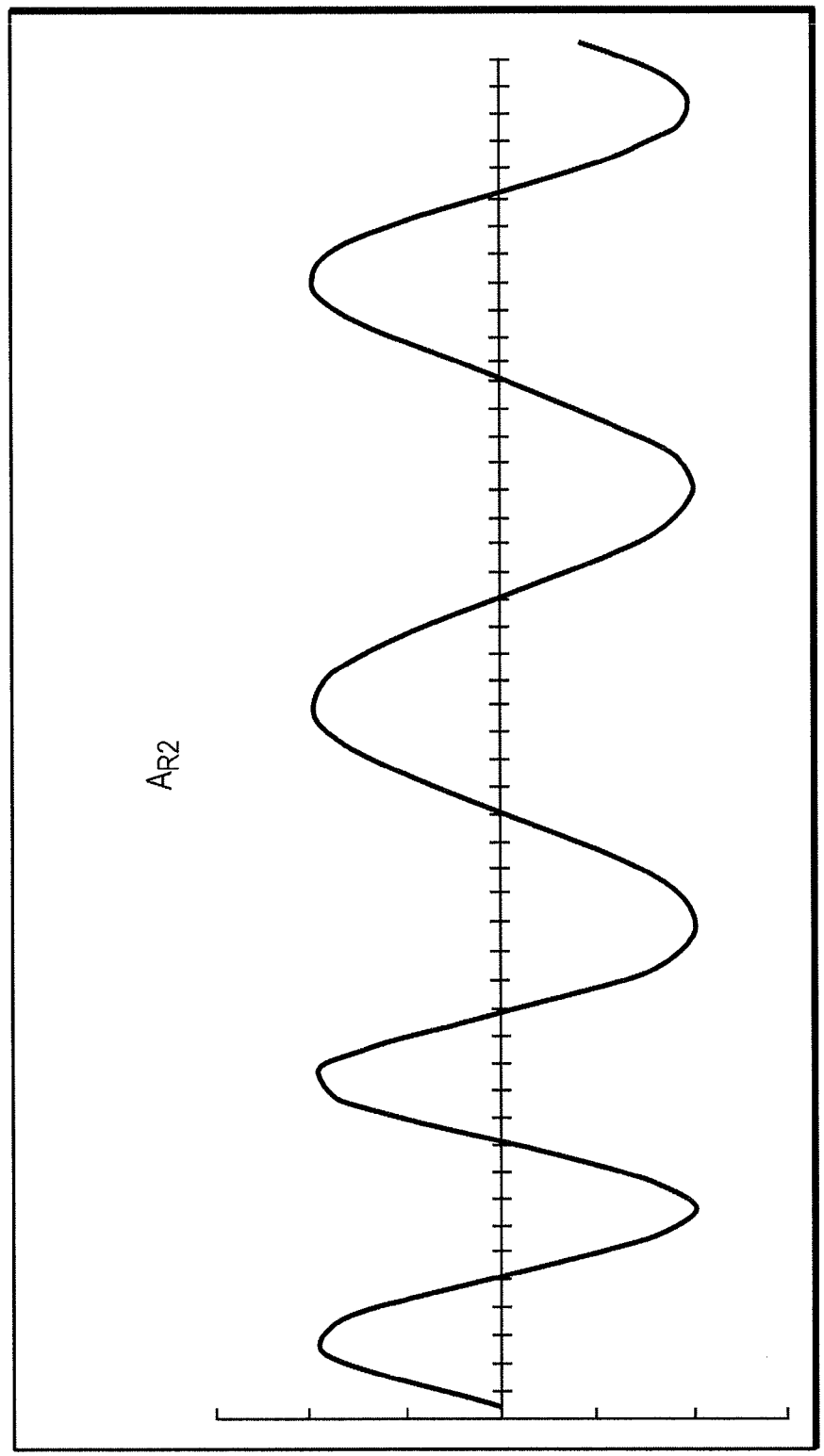
FIG. 7B illustrates track A where the pitch is randomized by random data stream R2.
Figure 8B:
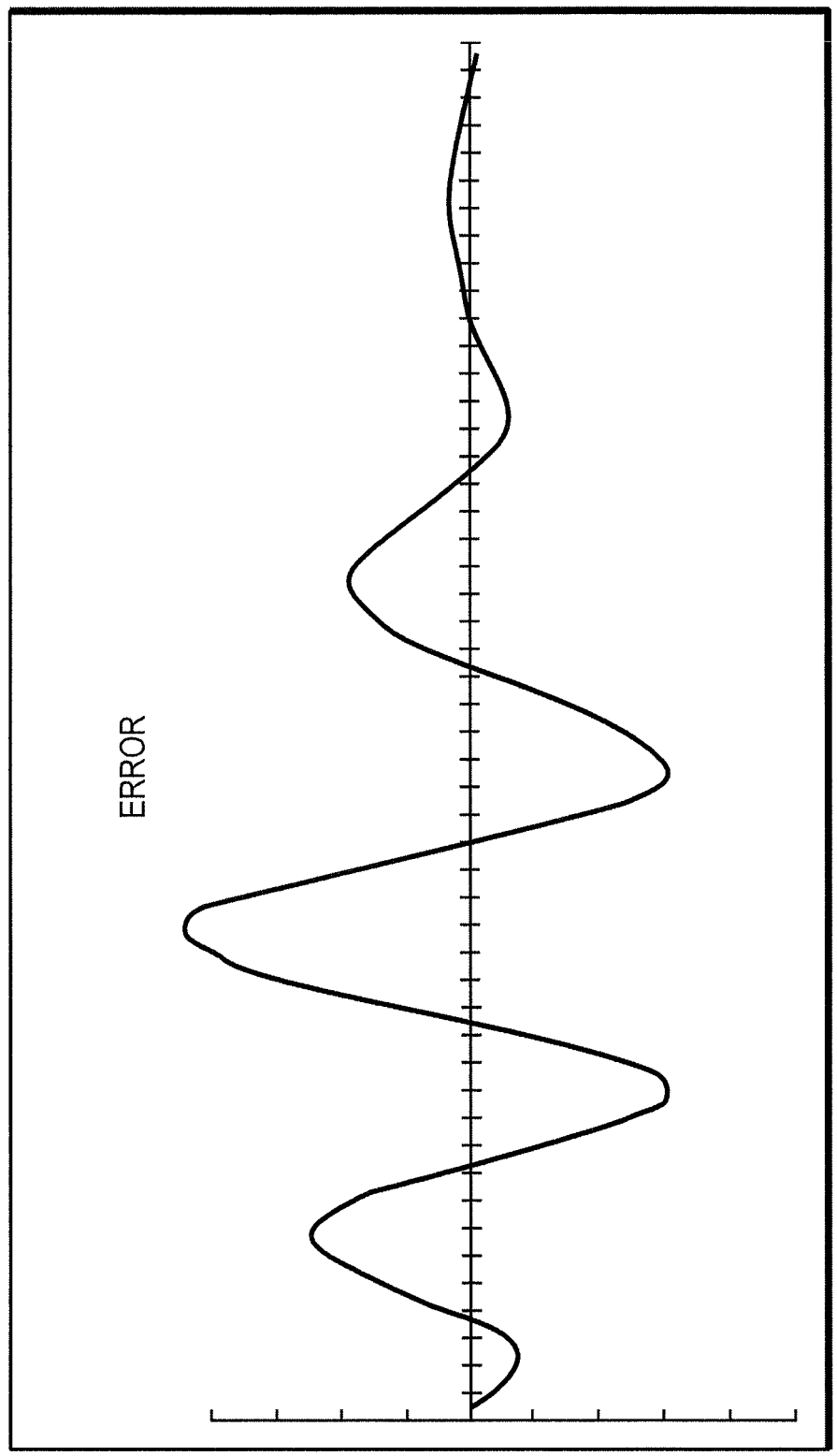
FIG. 8B illustrates a deviation of the result of the subtraction in FIG. 8A from the original track X, which is audible as phasing artifacts overlaid on track X.

Then, the mixed audio track is modified (Step 450) based on the audio modification data. FIG. 6B illustrates the mixed audio track A+X as-modified by applying audio modification data R1. In some embodiments, the random data stream controls a resampling ratio. The resampling ratio can cause the pitch of the mixed audio track to be altered slightly. In some embodiments, the random data stream controls a timer which causes switching among pre-determined resampling ratios. In some of those embodiments, a predetermined resampling ratio can exclude 1.0, such that the playback is never at its original rate. In some embodiments, the pitch shift is accomplished using resampling and interpolation, producing a non-frequency-preserving and/or non-time-preserving pitch shift. Then the modified mixed audio track is provided (Step 460) for playback by the video game platform.

In some embodiments, the random data stream generator is implemented as follows. A random number generator with a seed of s generates a time delay value in the range of 1 to 2 seconds, although other time ranges are also possible. In some embodiments, the time delay values are drawn from a pre-determined set of possible values. In some embodiments, the time delay values are selected in a pre-determined pattern. For the duration of the period determined by the time delay value, the value produced by the random stream generator is a specific value. In some embodiments, this value represents a resampling ratio that is used to alter the pitch of a signal. In some embodiments, the resampling ratio is in the range of −1.666% to +1.666%. In some embodiments, the resampling ratio is never 0%. The values produced by the random stream generator can be random and/or drawn from a pre-determined set of values. For example, the random stream generator can generate only −1.666% or +1.666%, and no other values. In another example, the random stream generator can generate any value between −1.666% or +1.666%. In another example, the random stream generator can generate only −1.666% or +1.666% for a first duration and then generate any value between −1.666% or +1.666%. In some embodiments, the random stream generator can generate any value. In some embodiments, a pattern of values produced by the random stream generator can be random, or it can be pre-determined, for example, alternating between increased and decreased pitch. After the specified time expires, a new time delay value can be generated.

In the most sensitive band of human hearing, between 1 KHz and 2 KHz, the threshold for perceiving a pitch shift is approximately 4 to 5 percent. In some embodiments, the resampling ratio is modified by positive or negative 1.666%, so as to be below the level of human perception. In some embodiments, the random stream generator produces an alternating series of values such that the pitch alternates between being shifted +1.666% and −1.666% of the normal pitch, and varies at random intervals between 1 and 2 seconds.

In some embodiments, the random data stream is applied to the first audio track and the second audio track before mixing the first audio track with the second audio track. In these embodiments, the same random seed may be used to produce identical random data streams for the audio tracks. In some embodiments, the first audio track and the second audio track are mixed to produce a mixed audio track, and then the random data stream is applied to the mixed audio track.

The audio tracks are not always limited to tracks or audio from a single instrument. For example, in some embodiments, the first audio track includes an audio data from a first musical instrument and partial audio data from a second musical instrument. For example, when a vocal part and a guitar part are performed and recorded at the same time, part of the vocals may "bleed" into the guitar audio track and some of the guitar part will "bleed" into the vocal audio track.

The benefit of the technique described herein is that when the audio modification data is applied to a mixed audio track, it is undetectable by the human ear. Upon a second playback of the mixed audio track, the audio modification data produces a deviation from the first playback of the mixed audio track sufficient to make isolation of an original audio track impossible. For example, assume a discrete first audio track A(t) and a discrete second audio track X(t) containing stem audio data with a sample rate of 44 KHz. The discrete first audio track A(t) and the discrete second audio track X(t) can be samples of a continuous audio track. Also assume a discrete random data stream R(t,s1), where s1 is a random seed and where the sample rate is the same as for A(t) and X(t). The discrete random data stream R(t,s1) includes resampling ratios, as described above, that vary the pitch of a signal. The techniques used to apply the resampling ratio to the signal are known in the art, thus are not further discussed here. For the first play-through, assume a perfect performance by the player, resulting in an uninterrupted X(t) output. After resampling and mixing (or mixing and resampling), the resulting audio output is nearly indistinguishable from a standard stereo mix.

The random data stream R(t,s) can use a different seed for each play-through. In the second play-through, assume that s2 is used as the seed, so R(t,s2) produces a different series of resampling ratios than R(t,s1). In this performance, the player misses all of the cues corresponding to the stem X(t). Thus, X(t) is not present in the final mix. After resampling and mixing (or mixing and resampling), the second play-through is nearly indistinguishable from a music-minus-one recording, with the instrument corresponding to X(t) not present. When subtracting the second performance from the first performance, however, the result is close to X(t), but has significant and very perceptible flanging artifacts. In some embodiments, X(t) is not randomized during the second playback. In these embodiments, subtracting the second playback from the first playback also yields very perceptible flanging artifacts.

The above-described techniques can be implemented in digital electronic circuitry, or in computer hardware, firmware, software, or in combinations of them. The implementation can be as a computerized method or process, or a computer program product, i.e., a computer program tangibly embodied in a machine-readable storage device, for execution by, or to control the operation of, data processing apparatus, e.g., a programmable processor, a computer, a game console, or multiple computers or game consoles. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or game console or on multiple computers or game consoles at one site or distributed across multiple sites and interconnected by a communication network.

Method steps can be performed by one or more programmable processors executing a computer or game program to perform functions of the invention by operating on input data and generating output. Method steps can also be performed by, and apparatus can be implemented as a game platform such as a dedicated game console, e.g., PLAYSTATION® 2, PLAYSTATION® 3, or PSP® manufactured by Sony Corporation; WII™, NINTENDO DS®, NINTENDO DSi™, NINTENDO DSi XL™ or NINTENDO DS LITE™ manufactured by Nintendo Corp.; or XBOX® or XBOX 360® manufactured by Microsoft Corp. or special purpose logic circuitry, e.g., an FPGA (field programmable gate array) or an ASIC (application-specific integrated circuit) or other specialized circuit. Modules can refer to portions of the computer or game program and/or the processor/special circuitry that implements that functionality.

Processors suitable for the execution of a computer program include, by way of example, both general and special purpose microprocessors, and any one or more processors of any kind of digital computer or game console. Generally, a processor receives instructions and data from a read-only memory or a random access memory or both. The essential elements of a computer or game console are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a player, the above described techniques can be implemented on a computer or game console having a display device, e.g., a CRT (cathode ray tube) or LCD (liquid crystal display) monitor, a television, or an integrated display, e.g., the display of a PSP® or Nintendo DS. The display can in some instances also be an input device such as a touch screen. Other typical inputs include simulated instruments, microphones, or game controllers. Alternatively input can be provided by a keyboard and a pointing device, e.g., a mouse or a trackball, by which the player can provide input to the computer or game console.

Other kinds of devices can be used to provide for interaction with a player as well; for example, feedback provided to the player can be any form of sensory feedback, e.g., visual feedback, auditory feedback, or tactile feedback; and input from the player can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer or game console having a graphical player interface through which a player can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing/gaming system can include clients and servers or hosts. A client and server (or host) are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Some aspects of the inventions described herein are reflected in the following claims, but the inventions are not limited to these. Specifically there are apparatuses configured to carry of the steps of the following methods, apparatuses whose components embody the claim elements below and there are computer program products, tangible embodied in a computer-readable storage medium, which includes instructions operable to cause a data processing apparatus to perform the following methods.

What is claimed is:

1. A method for preventing filtering of original audio tracks from a song executed on a computerized game platform comprising:
   providing a first audio track representing a part of a musical composition;
   providing a second audio track representing at least one part of a musical composition, the at least one part being different than the part represented by the first track;
   mixing, at one or more processors, the first audio track and the second audio track to provide a mixed audio track;
   generating an audio modification data comprising a series of substantially random audio modifiers; and
   modifying, at one or more processors before playback, the mixed audio track based on the audio modification data to provide a modified mixed audio track.

2. The method of claim 1 wherein the second audio track is randomized during a subsequent playback based on second audio modification data.

3. The method of claim 1 wherein generating the audio modification data further comprises determining the substantially random audio modifiers by setting the substantially random audio modifiers to a first value for a first random time interval and setting the substantially random audio modifiers to a second value for a second random time interval.

4. The method of claim 3 wherein the first random time interval and the second random time interval are between 1 and 2 seconds.

5. The method of claim 3 wherein modifying the mixed audio track by the substantially random audio modifiers changes pitch of the mixed audio track and the first value produces a positive 1.666 percent change in pitch and the second value produces a negative 1.666 percent change in pitch.

6. The method of claim 1 wherein modifying the mixed audio track comprises speeding up the mixed audio track or slowing down the mixed audio track based on the substantially random audio modifiers.

7. The method of claim 1 further comprising playing at least one of the mixed audio track and the modified mixed audio track.

8. The method of claim 1 wherein the substantially random audio modifiers alter the mixed audio track such that the modification changes pitch of the mixed audio track.

9. The method of claim 1 wherein the first audio track and the second audio track are guitar tracks, bass tracks, vocal tracks, drum tracks, other musical instrument tracks or any combination thereof.

10. A method executed on a game platform comprising:
    providing a first audio track representing a part of a musical composition;
    providing a second audio track representing at least one part of a musical composition, the at least one part being different than the part represented by the first track;
    generating an audio modification track comprising a series of substantially random audio modifiers;
    mixing, at one or more processors, the first audio track and the second audio track to provide a mixed audio track; and
    modifying, at one or more processors before playback, the mixed audio track based on the audio modification track.

11. A method executed on a game platform comprising:
    providing a first audio track representing a part of a musical composition;
    providing a second audio track representing at least one part of a musical composition, the at least one part being different than the part represented by the first track;
    mixing, at one or more processors, the first audio track and the second audio track to provide a mixed audio track;
    generating an audio modification track comprising a series of substantially random audio modifiers; and
    modifying, at one or more processors before playback, the mixed audio track based on the audio modification track.

12. A method executed on a game platform comprising:
    providing a first audio track representing a part of a musical composition;
    providing a second audio track representing at least one part of a musical composition, the at least one part being different than the part represented by the first track;
    generating an audio modification track comprising a first series of substantially random audio modifiers;
    modifying, at one or more processors before playback, the first audio track based on the audio modification track;
    modifying, at one or more processors before playback, the second audio track based on the audio modification track;
    and
    mixing, at one or more processors, the modified first audio track and the modified second audio track to provide a mixed audio track for playback.

13. A method for preventing filtering of original audio tracks from a song executed on a computerized game platform comprising:
 providing a first audio track representing a part of a musical composition;
 providing a second audio track representing at least one part of a musical composition, the at least one part being different than the part represented by the first track;
 generating an audio modification track comprising a series of substantially random audio modifiers;
 mixing, at one or more processors, the first audio track and the second audio track to provide a mixed audio track; and
 modifying, at the one or more processors before playback, the mixed audio track based on the audio modification track to provide a modified mixed audio track.

14. A computer program product, tangibly embodied in a computer-readable medium, for preventing filtering of original audio tracks from a song, the computer program product including executable instruction operable to cause a game platform to:
 provide two or more original audio tracks;
 mix the two or more original audio tracks to provide a mixed audio track;
 generate an audio modification track comprising a series of substantially random audio modifiers; and
 modify, before playback, the mixed audio track based on the audio modification track to provide a modified mixed audio track.

15. A computer program product, tangibly embodied in a computer-readable medium, for preventing filtering of original audio tracks from a song, the computer program product including executable instruction operable to cause a game platform to:
 provide a first audio track representing a part of a musical composition;
 provide a second audio track representing at least one part of a musical composition, the at least one part being different than the part represented by the first track;
 generate an audio modification track comprising a first series of substantially random audio modifiers;
 modify, before playback, the first audio track based on the audio modification track;
 modify, before playback, the second audio track based on the audio modification track; and
 mix the modified first audio track and the modified second audio track to provide a mixed audio track for playback.

16. A computer program product, tangibly embodied in a computer-readable medium, for preventing filtering of original audio tracks from a song, the computer program product including executable instruction operable to cause a game platform to:
 provide a first audio track representing a part of a musical composition;
 provide a second audio track representing at least one part of a musical composition, the at least one part being different than the part represented by the first track;
 generate an audio modification track comprising a series of substantially random audio modifiers;
 mix the first audio track and the second audio track to provide a mixed audio track; and
 modify, before playback, the mixed audio track based on the audio modification track to provide a modified mixed audio track.

17. A method for preventing filtering of original audio tracks from a song executed on a computerized game platform comprising:
 providing a first audio track representing a part of a musical composition;
 providing a second audio track representing at least one part of a musical composition, the at least one part being different than the part represented by the first track;
 generating an audio modification data comprising a series of substantially random audio modifiers;
 modifying, at one or more processors before playback, the first audio track based on the audio modification data to provide a modified first audio track;
 modifying, at one or more processors before playback, the second audio track based on the audio modification data to provide a modified second audio track; and
 mixing, at one or more processors, the first modified audio track and the second modified audio track to provide a modified mixed audio track.

\* \* \* \* \*